(12) United States Patent
Colwell et al.

(10) Patent No.: US 11,159,416 B1
(45) Date of Patent: Oct. 26, 2021

(54) SYSTEMS AND METHODS OF TESTING VIRTUAL PRIVATE NETWORK COMMUNICATIONS USING REMOTE CONNECTIVITY

(71) Applicant: HEADSPIN, INC., Palo Alto, CA (US)

(72) Inventors: Brien Colwell, Redwood City, CA (US); Marius Nita, San Mateo, CA (US); Jonathan Rafkind, Menlo Park, CA (US); Manish Lachwani, Los Altos, CA (US)

(73) Assignee: HEADSPIN, INC., Palo Alto, CA (US)

( * ) Notice: Subject to any disclaimer, the term of this patent is extended or adjusted under 35 U.S.C. 154(b) by 222 days.

(21) Appl. No.: 16/533,210

(22) Filed: Aug. 6, 2019

Related U.S. Application Data

(63) Continuation-in-part of application No. 15/783,859, filed on Oct. 13, 2017, now abandoned.

(60) Provisional application No. 62/409,810, filed on Oct. 18, 2016.

(51) Int. Cl.
*H04L 12/26* (2006.01)
*H04L 12/46* (2006.01)
*H04L 12/939* (2013.01)

(52) U.S. Cl.
CPC .......... *H04L 43/50* (2013.01); *H04L 12/4633* (2013.01); *H04L 12/4641* (2013.01); *H04L 49/55* (2013.01)

(58) Field of Classification Search
CPC ............ H04L 12/4633; H04L 12/4641; H04L 29/08909; H04L 29/08099; H04L 49/55; H04L 43/50; H04L 63/0272; H04L 67/289; H04L 67/2895
See application file for complete search history.

(56) References Cited

U.S. PATENT DOCUMENTS 8,175,538 B1 5/2012 Chen et al.
8,621,091 B1 12/2013 Akalin et al.
9,170,922 B1 10/2015 Lachwani et al.
(Continued)

OTHER PUBLICATIONS

Doan, Phuoc Huu, "Advisory Action dated Jan. 9, 2017", U.S. Appl. No. 14/850,798, The United States Patent and Trademark Office, dated Jan. 9, 2017.
(Continued)

*Primary Examiner* — Kent Krueger
(74) *Attorney, Agent, or Firm* — Lindauer Law, PLLC

(57) ABSTRACT

Mobile devices executing applications utilize data services worldwide. Testing of the applications for networking issues is facilitated by utilizing a test network having proxy devices placed at different physical locations. A tester may use the test network to direct traffic to and from an application under test to one of the proxy devices. Using the proxy device, the traffic is then exchanged with a real-world network, such as a cellular data network, at the different locations. The tester may thus test operation of the application under test in real-world conditions at a variety of different physical locations. The system may include a proxy host device with an intermediate module to establish Virtual Private Network (VPN) connections and to capture VPN data, including VPN protocol data, session data, and other data. The VPN data may be provided to a network system to analyze performance of an application under test.

20 Claims, 20 Drawing Sheets

(56) References Cited

U.S. PATENT DOCUMENTS

| | | |
|---|---|---|
| 9,356,883 B1 | 5/2016 | Borthakur |
| 9,660,895 B1 | 5/2017 | Bennett |
| 9,681,318 B1 | 6/2017 | Lachwani et al. |
| 9,749,888 B1 | 8/2017 | Colwell et al. |
| 2001/0049263 A1 | 12/2001 | Zhang |
| 2002/0013841 A1 | 1/2002 | Schweitzer et al. |
| 2004/0060056 A1 | 3/2004 | Wellons et al. |
| 2005/0114706 A1 | 5/2005 | DeStefano et al. |
| 2006/0195894 A1 | 8/2006 | Nita et al. |
| 2006/0293777 A1 | 12/2006 | Breitgand et al. |
| 2007/0055476 A1 | 3/2007 | Whisnant et al. |
| 2007/0094356 A1 | 4/2007 | Sethi et al. |
| 2007/0121674 A1 | 5/2007 | Chen et al. |
| 2008/0298367 A1* | 12/2008 | Furukawa ......... H04L 29/12216 370/392 |
| 2010/0094990 A1 | 4/2010 | Ben-Yehuda et al. |
| 2011/0090939 A1 | 4/2011 | Diener et al. |
| 2011/0151864 A1 | 6/2011 | Byun et al. |
| 2012/0158908 A1 | 6/2012 | Luna et al. |
| 2013/0074048 A1 | 3/2013 | Osawa et al. |
| 2014/0040628 A1 | 2/2014 | Fort et al. |
| 2014/0113625 A1 | 4/2014 | Gruber et al. |
| 2014/0359139 A1 | 12/2014 | Efrati et al. |
| 2015/0208258 A1 | 7/2015 | Brenzel et al. |
| 2015/0312127 A1* | 10/2015 | Leemet ............... H04L 41/5032 709/224 |
| 2015/0319048 A1 | 11/2015 | Griff et al. |
| 2015/0370304 A1 | 12/2015 | Salah et al. |
| 2016/0133231 A1 | 5/2016 | Liu et al. |
| 2016/0205720 A1 | 7/2016 | Mandanapu |
| 2016/0254967 A1 | 9/2016 | Brown et al. |
| 2016/0267930 A1 | 9/2016 | Chu et al. |
| 2017/0366421 A1* | 12/2017 | Dam ....................... H04L 43/06 |
| 2019/0028465 A1 | 1/2019 | Allen et al. |

OTHER PUBLICATIONS

Doan, Phuoc Huu, "Final Office Action dated Nov. 4, 2016", U.S. Appl. No. 14/850,798, The United States Patent and Trademark Office, dated Nov. 4, 2016.

Doan, Phuoc Huu, "Non-Final Office Action dated Nov. 14, 2017", U.S. Appl. No. 15/494,105, The United States Patent and Trademark Office, dated Nov. 14, 2017.

Doan, Phuoc Huu, "Final Office Action dated Apr. 3, 2018", U.S. Appl. No. 15/494,105, The United States Patent and Trademark Office, dated Apr. 3, 2018.

Doan, Phuoc Huu, "Non-Final Office Action dated Jun. 2, 2016", U.S. Appl. No. 14/850,798, The United States Patent and Trademark Office, dated Jun. 2, 2016.

Doan, Phuoc Huu, "Notice of Allowance dated Feb. 14, 2017", U.S. Appl. No. 14/850,798, The United States Patent and Trademark Office, dated Feb. 14, 2017.

Doan, Phuoc Huu, "Notice of Allowance dated Jun. 6, 2018", U.S. Appl. No. 15/494,105, The United States Patent and Trademark Office, dated Jun. 6, 2018.

Patel, Kamini B., "Non-final Office Action dated Feb. 27, 2019", U.S. Appl. No. 15/619,181, The United States Patent and Trademark Office, dated Feb. 27, 2019.

Wu, Daxin, "Final Office Action dated Sep. 13, 2019", U.S. Appl. No. 15/941,674, The United States Patent and Trademark Office, dated Sep. 13, 2019.

\* cited by examiner

SYSTEMS AND METHODS OF TESTING VIRTUAL PRIVATE NETWORK COMMUNICATIONS USING REMOTE CONNECTIVITY

PRIORITY

This application claims priority to pending U.S. application Ser. No. 15/783,859 filed on Oct. 13, 2017 and entitled "System For Testing Using Remote Connectivity", which is a non-provisional of U.S. Patent Application Ser. No. 62/409,810 filed on Oct. 18, 2016 entitled "System for Testing Using Remote Connectivity". The entirety of these previously filed applications are hereby incorporated by reference.

INCORPORATION BY REFERENCE

The following are incorporated by reference for all that they contain:

"System for Application Test" filed on Sep. 10, 2015, application Ser. No. 14/850,798, now U.S. Pat. No. 9,681,318.

"System for Network Characteristic Assessment" filed on Dec. 21, 2015, application Ser. No. 14/976,480, now U.S. Pat. No. 9,749,888.

"Adaptive Application Behavior Based on Assessed Network Characteristics" filed on Feb. 23, 2016, Application No. 62/298,820.

"Mobile Device Point of Presence Infrastructure" filed on Mar. 3, 2016, Application No. 62/303,327.

"System for Management of an Array of Proxy Access Devices" filed on Mar. 3, 2016, Application No. 62/303,337.

"System for Assisting in Assessment and Mitigation of Data Network Operations" filed on Jun. 30, 2016, Application No. 62/357,008.

BACKGROUND

Mobile devices executing applications that utilize data networks during operation may experience failures or otherwise produce adverse user experiences as a result of network conditions. Testing of these applications may be performed to prevent or mitigate the impacts of failures.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
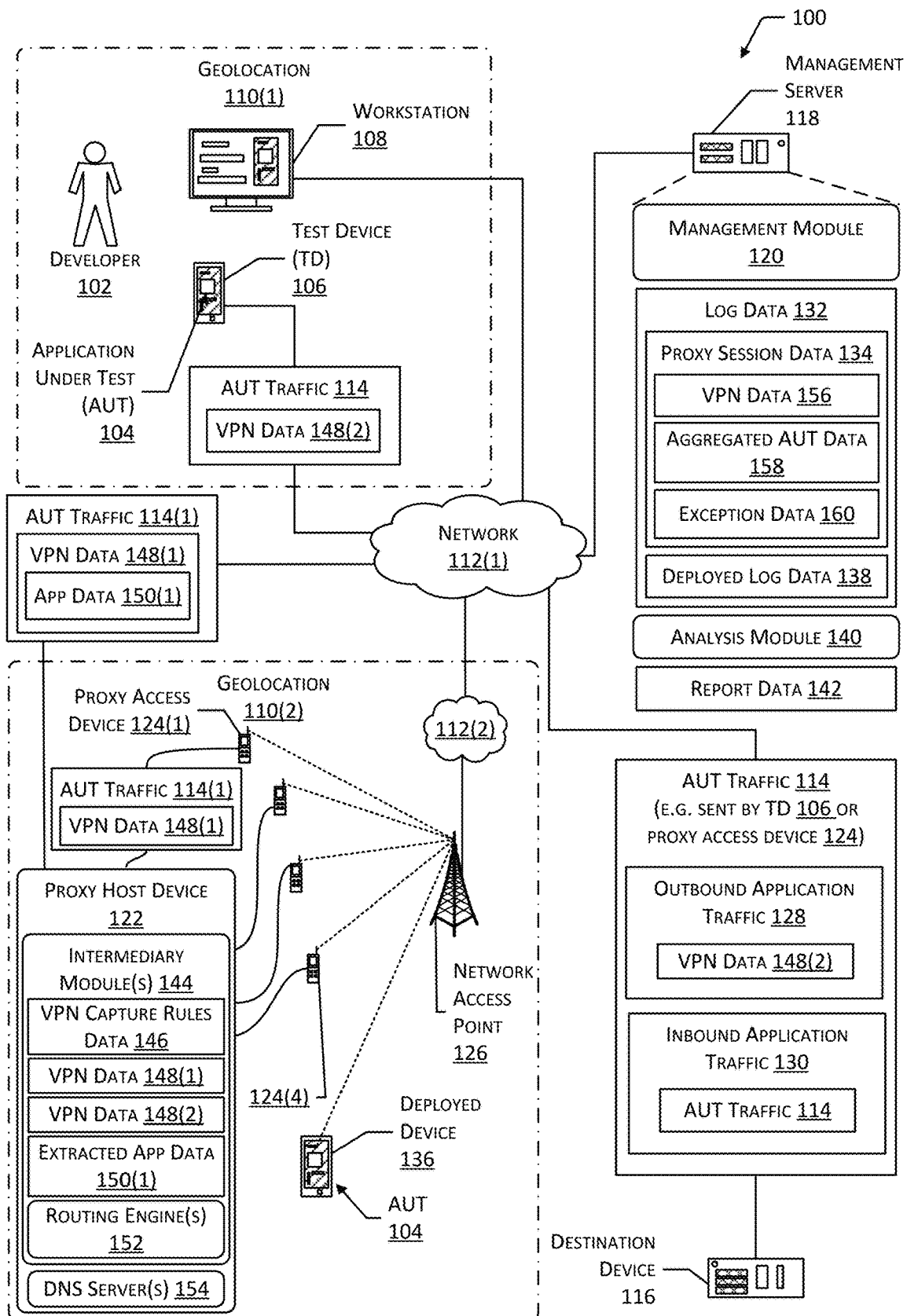
FIG. 1 depicts a block diagram of a system for testing applications that utilizes virtual private network resources, according to one implementation.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Mobile devices may execute an application to provide various functions. Mobile devices may include, but are not limited to, smartphones, laptops, tablet computers, embedded devices, wearable computing devices, appliances, automobiles, aircraft, and so forth. Functions provided by the application may involve retrieval of data, presentation of that data to a user, processing of data, and so forth.

Some applications may communicate with a destination device, such as a server, using a network. For example, a mapping application may send a mapping server information indicative of a position of the mobile device and receive map data to present on a display of the mobile device. Problems with this communication may result in the application failing to perform the desired function, error messages, improper operation, and so forth. Continuing the example above, a long latency or delay in receiving the map data may cause the application on the mobile device to present an error to the user. These problems may result in an adverse user experience. For example, the user may discontinue using the application because of these problems, and instead use another application.

Some problems that the application may encounter while using the network may not be immediately perceived by the user. For example, the application may be draining the battery of the mobile device by excessively accessing the destination device, may consume more data than desired, and so forth.

The network used by the mobile device to access the destination device may include a wireless wide area network (WWAN), such as a wireless cellular data network (WCDN). For example, the mobile device may comprise a smartphone that accesses a WCDN provided by a telecommunication company. By using the WCDN, the smartphone is able to send and receive data to and from other devices, such as those accessible on the Internet.

Performance of the network used by the mobile device executing the application may be variable due to many factors. These factors may include the geographic location (geolocation) of where the mobile device is located while communicating with the network, the network access point in use, congestion at the network access point, congestion at the interconnect that connects the WCDN to the Internet, capability of the network access point, and so forth. For example, during a morning commute, many users may be streaming video entertainment content to their mobile devices, resulting in overall network congestion. In another example, the telecommunication company may have some network access points that support 3G data transmission while other network access points are able to support 4G data transmission.

The application may be tested prior to release to a general population of users. This "pre-launch" testing phase may involve analyzing the performance of an application under test (AUT) under different network conditions. The different network conditions have traditionally been obtained by either simulation or by physically transporting a test device (TD) that is executing the AUT to a particular geolocation. Simulation lacks fidelity to real-world conditions, is expensive to build and maintain, and may result in developers correcting problems that appear in simulation but not in the real-world. As a result, simulation of varying network conditions is of limited value. Physically transporting the TD and an operator to perform the tests may provide useful test data, but is expensive and time consuming. At the same time, testing has become even more important given the worldwide deployment and use of applications.

Once the application has been deployed to the general population of users and is in a "post-launch" phase, additional information about the conditions of the network and the use by the application of the network may be also useful to the developer. For example, data about geolocation and connectivity to the network during usage of the application may allow the developer to adjust the application to provide a better experience to the user.

Further, some applications may use secure communications through one or more communications networks. For example, an application may establish a virtual private network (VPN) connection for sending and receiving data between a first device and a second device, such as between a smartphone device and a database of a company. A VPN is a network that is constructed using public network resources, such as the Internet, to connect remote devices. A VPN provides a "secure", encrypted tunnel in which data may be transmitted between a first device and a second device. To establish a VPN connection, a first device and a second device may exchange public keys or other security tokens to establish encrypted communications. Data may then be exchange in encrypted form through the public network resources.

Embodiments of systems, devices, and methods are described below that enable testing of such secure communications. In some implementations, an intermediary module may be included within a VPN connection. The intermediary module may be configured to determine VPN data, VPN protocol information, and other data associated with the VPN connection between the first device and the second device. The intermediary module may be implemented as a smart module that can be configured to determine an error, which may be indicative of detection of the intermediary module by the first device, the second device, or both. The intermediary module may not have been detected, but the error may be a type of error that may be caused by detection of the intermediary module. For example, the error may include a change in operation of one or both devices, which change may differ from normal operating behavior and which may indicate that at least one of the devices has initiated one or more security measures based on the VPN connection being compromised. In another example, the error may include a transport layer security (TLS) exception, which may be indicative of detection of the intermediary module. In this example, the intermediary module may not have actually been detected, but the intermediary module may terminate capture of the VPN data. The intermediary module may terminate the capture preemptively so that the performance of a proxy access device is not impacted.

In still another example, the error may include a communication protocol error. In some implementations, the error may include one or more of an unexpected message, a bad record Media Access Control (MAC) address error, a record overflow error, a decryption failed error, a decompression error, a handshake error, a certificate error, an illegal parameter error, an access error, a decoding error, a decryption error, a protocol version error, an insufficient security error, an internal error, a user-canceled error, a "no renegotiation" error, an unsupported extension error, another error, or any combination thereof. In some implementations, the errors may also include unexpected delays in receipt of signals, decode errors, a request for renegotiation, or other errors. Such errors may be indicative of detection of the presence of the intermediary module within the VPN connection. The intermediary module may not have actually been detected, but may terminate the capture of data from the VPN connection preemptively so that the presence of the intermediary module does not impact performance of the device.

In response to such an error, the intermediary module may stop determining VPN data associated with the VPN connection and may store a marker or other indicator in a data repository indicating that the intermediary module may have been detected. Further, the intermediary module may determine a host-port pair associated with the VPN connection and may store the host-port pair in an exceptions list that may be part of a set of network rules. Subsequently, in response to receiving a VPN request involving the host-port pair (or involving another host-port pair in the exceptions list), the system may avoid establishing the intermediary module as part of the VPN connection.

In a particular example, some secure communications may utilize proprietary security protocols for particular host-port pairs, which may detect the presence of the intermediary module. To enable testing of such devices, the system may avoid attempting to capture data from connections involving such host-port pairs. For example, secure communications between an iPhone by Apple Computers, Inc. may utilize a proprietary protocol for interactions with the Apple Appstore, and the exceptions list may exclude the particular host-port pair to avoid triggering a TLS exception or other communication protocol violation error that may cause the iPhone to alter its operation. Other devices, such as Android smartphones, may also have proprietary security protocols, which can be avoided by excluding host-port pairs. Other implementations are also possible.

Described in this disclosure are techniques and systems to acquire information in one or more of the pre-launch phase and post-launch phase of the application. Pre-launch testing may be facilitated using a collection of proxy host devices that connect to a first network and one or more proxy access devices that provide access to a second network. The proxy access device may execute a local traffic module to facilitate the transfer of data between the first network and the second network. The transfer may be unidirectional or bidirectional. In some implementations, the local traffic module may execute within a non-privileged user space of an operating system of the proxy access device.

The proxy access devices may be located at various geolocations, may utilize different telecommunication companies, and so forth. The proxy access devices may be homogenous, such as of the same make and model, or may differ from one another. For example, the proxy access devices may comprise relatively inexpensive commodity cellphones that provide data connectivity to the WCDN of a particular telecommunication company. Continuing the example, each proxy access device may include a unique subscriber identity module (SIM) that stores information used to connect to the WCDN.

During pre-launch testing, the AUT may be used with a pre-launch software development kit (SDK) that provides the functionality described next. The AUT executes on the TD and generates AUT traffic. The AUT traffic may include outbound application traffic and inbound application traffic. The AUT traffic may be destined for one or more destination devices. During operation outside of the testing system described herein, the AUT traffic would typically be transferred to the destination device using the first network at the first geolocation where the test device is located.

As described in this disclosure, during testing, the developer may use the functionality in the pre-launch SDK to select a particular proxy access device to use for testing. For example, the developer who is present in Sacramento, Calif., USA, may want to test operation of the AUT on the WCDN in Bangalore, Karnataka, India. Continuing the example, the developer utilizes a user interface provided by the pre-launch SDK to select the proxy access device in Bangalore. Once selected, in one implementation the pre-launch SDK redirects the AUT traffic to the selected proxy access device by way of the first network. In another implementation, router configuration data may be sent to a router through which the AUT traffic will be sent. Responsive to the router configuration data, the router may be configured to subsequently direct the AUT traffic to the selected proxy host device.

The proxy access device, in turn, transfers data between the first network and a second network. For example, the proxy access device located in Bangalore may be a cellphone that is tethered to a proxy host device and also is able to connect to the Vodafone India WCDN. The proxy host device provides various functions. These functions may include configuring the proxy access device, retrieving status data about the proxy access device, connecting the proxy access device to the first network, gathering proxy session data, and so forth. In some implementations, the proxy host device may include one or more intermediary modules, which may be used to become part of a VPN connection between a first device and a second device. The intermediary module may be used to determine VPN data, VPN protocol information, and other information associated with the VPN connection. Such determined data may be analyzed to determine one or more performance attributes of the application under test.

The outbound application traffic is sent from the TD at a first geolocation to a proxy host device using the first network, which then sends the AUT traffic to the proxy access device. In some implementations, the outbound application traffic may be sent through a VPN connection, and the intermediary module may determine VPN data from such outbound application traffic. The proxy host device may store the VPN data locally and may provide the VPN data to a management server for analysis. The proxy access device in turn sends the traffic to the second network, such as the WCDN. The inbound application traffic is received from the second network at the proxy access device and is sent to the proxy host device at a second geolocation. The proxy host device in turn sends the inbound application traffic to the TD. From the standpoint of the AUT, by using the pre-launch SDK functionality without the TD ever having physically moved from the first geolocation, the network being used to access the destination device is the WCDN in India at the second geolocation where the proxy access device is located.

As mentioned above, the proxy host device may gather proxy session data. The proxy session data may include, but is not limited to, packet captures, metrics associated with connectivity to the second network, and so forth. For example, the proxy session data may indicate the time when a Hypertext Transfer Protocol (HTTP) request was sent and the time when a response to the request was received. This information may be used to determine latency associated with the request, as measured at the second geolocation. Because the proxy session data is obtained at the second geolocation, network issues associated with the connection between the TD and the proxy access device are not collected. Additionally, the proxy host device may capture VPN data and other information from a VPN connection using the intermediary module. The VPN data and other information may include information related to VPN protocols and other information.

Post-launch, the AUT may be deployed with a post-launch SDK that allows for the collection and transmission of deployed log data. The deployed log data provides information about the real-world use of deployed devices that are being utilized by users. This information may include details about what function of the AUT was in use, network conditions, geolocation of the deployed device, and so forth. The end user may be offered the opportunity to opt in or opt out of the collection of the deployed log data. The deployed log data may omit identifying information or may otherwise be anonymized to maintain the confidentiality of the user.

In some implementations, the post-launch SDK provides for the acquisition of the deployed log data while executing within a non-privileged user space of an operating system of the deployed device. For example, the post-launch SDK may be included during compile-time in the production of the AUT. While executing, the post-launch SDK may then gather the deployed log data. The deployed log data may be provided to a server using a push or pull mechanism. For example, the push mechanism executing on the deployed device may send the deployed log data every five minutes the application is executing. In another example, the pull mechanism may involve the server polling the deployed device to request transmission of the deployed log data that may be available.

The proxy session data, the deployed log data, the VPN data, and so forth, may be analyzed to generate information about the AUT, interaction with the destination device, performance of the second network, and so forth. Report data may be generated and provided to the developer or other entities for subsequent use. Based on the report data, the AUT may be modified, the telecommunication company may be provided with diagnostic information for them to improve their performance, and so forth.

By using the techniques described herein, testing of an AUT may be performed in one or both of the pre-launch and post-launch phases quickly, comprehensively, and cost effectively. For example, the developer may select a particular proxy access device to use and run tests of the AUT using the second network without ever leaving their office. Effects on the AUT resulting from network issues may be discovered more readily and corrected, resulting in an improved user experience, improved mobile device battery life, a reduction in otherwise unnecessary traffic on the second network, and so forth.

FIG. 1 depicts a system 100 for testing applications that utilizes network resources, according to one implementation. A developer 102 may be an individual, group of individuals, or entity that is tasked with creating a new application, maintaining an existing application, re-factoring an existing application, and so forth. The developer 102 may be working on an application under test (AUT) 104. The AUT 104 may be executed on a computing device such as a test device (TD) 106, a workstation 108, and so forth. For example, the TD 106 may comprise a mobile device such as a smart phone, tablet computer, wearable computing device, and so forth. The workstation 108 may comprise a laptop, desktop computer, and so forth.

The AUT 104 may be an application that is at any stage in a development or maintenance lifecycle. For example, the AUT 104 may comprise an alpha (or prerelease) version of software, or may comprise a previously released production version that is undergoing further testing. In some implementations, the AUT 104 may be configured to utilize a VPN connection for secure data transmissions.

The workstation 108 may include an integrated development environment (IDE) to facilitate the creation and editing of program code, debugging, compiling, and so forth. In some implementations, the workstation 108 may comprise an emulator or simulator that is designed to execute the AUT 104 as if it were executing on another piece of hardware, under a different operating system, and so forth.

The developer 102 may test the AUT 104 to determine problems associated with use of the AUT 104. Once those problems have been determined, they may be mitigated. For example, the developer 102 may change the program code of the AUT 104 to remedy the problem. The developer 102 may use the techniques described below to determine at least some of the problems associated with operation of the AUT 104.

One or more of the developer 102, the TD 106, or the workstation 108 may be located at a first geolocation 110(1). The geolocation 110 comprises a geographic location, such as a particular room, building, city, state, country, and so forth. For example, the geolocation 110 may be specified by a set of coordinates with regard to latitude and longitude on the surface of the Earth.

One or more of the TD 106 or the workstation 108 may be connected to a first network 112(1). The first network 112(1) may, in turn, be connected to or be part of a larger network. For example, the first network 112(1) may comprise the Internet. The connection used by the TD 106 or the workstation 108 may include, but is not limited to, a wired Ethernet connection, a wireless local area network (WLAN) connection such as Wi-Fi, and so forth. For example, the first geolocation 110(1) may comprise an office where the developer 102 is working. The TD 106 may connect to a local Wi-Fi access point that is connected via Ethernet cable to a router. The router, in turn, is connected to a cable modem that provides connectivity to the Internet via an Internet Service Provider (ISP).

During operation, the AUT 104 may rely on access to an external resource, such as a destination device 116. For example, the AUT 104 may comprise a social networking application that sends data generated by a user and retrieves for presentation information from a server. As a result, in some implementations, the AUT 104 may require access to the destination device 116 for normal operation. In some implementations, the AUT 104 may access the destination device 116 through a VPN connection.

A single destination device 116 is depicted for ease of illustration and not necessarily as a limitation. For example, the AUT 104 may exchange AUT traffic 114 with many different destination devices 116 during operation.

The AUT 104 may generate AUT traffic 114 including VPN data 148 that may be exchanged with the destination device 116 during operation. Traditionally, the AUT traffic 114 generated by the TD 106 at the first geolocation 110(1) would be sent to the first network 112(1) and to the destination device 116. However, this traditional situation limits the ability to generate test data to the first geolocation 110(1).

The system 100 may further include a management server 118 including a management module 120. The management server 118 may be coupled to the network 112(1).

The system 100 may further include a proxy host device 122 coupled to one or more proxy access devices 124 (PAD). The one or more proxy access devices 124 may be coupled to a network 112(2) through a network access point 126, such as a cellular base station. The network 112(2) may be coupled to the network 112(1), providing network connectivity for the one or more proxy access devices 124. The system 100 may further include a deployed device 136 including an AUT 104, which may be coupled to the network access point 126.

In some implementations, the AUT traffic 114 may comprise remote control traffic. For example, the developer 102 may remotely control the PAD 124, and the AUT 104 may execute locally on the PAD 124.

To provide the functionality described herein, the developer 102 may incorporate a software development kit (SDK) into the AUT 104. For example, at compile time, the SDK may be included into the compiled AUT 104. In other implementations, techniques other than an SDK may be used to provide the functionality described herein. For example, lines of computer code that provide the functionality of at least a portion of the SDK may be incorporated into the code base of the AUT 104.

The SDK may be configured to provide a user interface to the developer 102 that allows for the redirection of the AUT traffic 114. The SDK may comprise instructions to establish communication with the management server 118. For example, the SDK may add a user interface that allows the developer 102 to interact with the management module 120.

The management server 118 may utilize the management module 120 to coordinate the activities of one or more of proxy host devices 122 or proxy access devices 124. The proxy host device 122 may connect to the first network 112(1) and also to one or more of the proxy access devices 124. For example, the proxy host device 122 may comprise a desktop computer to which four proxy access devices 124 may be tethered. In some implementations, the proxy host device 122 may comprise a tablet computer, server, etc. Any number of proxy access devices 124 may be tethered to the proxy host device 122.

The proxy access devices 124, in turn, may be able to connect to a network access point 126. The network access point 126 provides connectivity to a second network 112(2). For example, the proxy access devices 124 may comprise commodity cellphones, the network access points 126 may comprise cell phone towers, and the second network 112(2) may comprise a WWAN, such as a wireless cellular data network (WCDN). The second network 112(2) may in turn be connected to the first network 112(1). For example, the WCDN operated by a telecommunication company may interconnect or have a peering agreement with an Internet backbone provider. As a result, a user of the second network 112(2) may be able to access resources on the first network 112(1), and vice versa.

The proxy access devices 124 may be located at a geolocation 110 that is different from that of the TD 106. For example, the proxy host device 122 and attached proxy access devices 124 may be installed at a second geolocation 110(2), such as in another city, state, country, and so forth.

Returning to the AUT 104, as part of the testing process, the developer 102 may use the user interface to access the management module 120 of the management server 118. From the user interface, the developer 102 may select one or more of a particular geolocation 110 or particular proxy access device 124 to use during testing. The management module 120 may maintain information about the proxy access devices 124, such as geolocation 110, availability, cost, type of proxy access device 124, and so forth.

The management module 120 may coordinate establishment of the first connection between the AUT 104 and the proxy access device 124 that was selected. For example, based on the selection by the developer 102, the management module 120 may determine the proxy host device 122 and retrieve information such as digital certificates, cryptographic credentials, network address, and so forth. In one implementation, the management module 120 may communicate with the proxy host device 122 to prepare the proxy host device 122 for communication with the AUT 104. In another implementation, the management module 120 may provide configuration data to the AUT 104, which in turn connects to the proxy host device 122 and sends the configuration data to the proxy host device 122.

During testing, the AUT traffic 114 may be routed through the first network 112(1) to the proxy host device 122, through the proxy access device 124 to the second network 112(2), and then on to the first network 112(1) to ultimately arrive at the destination device 116. The AUT traffic 114 may include outbound application traffic 128 and inbound application traffic 130. The outbound application traffic 128 may comprise data that is sent from the AUT 104 to the destination device 116. In some implementations, the outbound application traffic 128 may include VPN data 148. The inbound application traffic 130 may comprise data that is sent from the destination device 116 to the AUT 104. The inbound application traffic 130 may include AUT traffic 114, which may include VPN data 148. During operation, the AUT 104 directs the outbound application traffic 128 to the proxy host device 122 associated with the selected proxy access device 124. The proxy host device 122 in turn transfers the outbound application traffic 128 to the proxy access device 124, which then sends the outbound application traffic 128 to the second network 112(2). The second network 112(2) may then send the outbound application traffic 128 to the destination device 116. Inbound application traffic 130 from the destination device 116 may follow the reverse path.

The management server 118 may collect log data 132 associated with operation of the system. The log data 132 may include proxy session data 134. The proxy host device 122 may be configured to generate the proxy session data 134. The proxy session data 134 may include VPN data 156, aggregated AUT data 158, and exception data 160. The VPN data 156 may include VPN data 148 received from one or more applications under test (AUTs) 104, from the proxy host device 122, from the destination device 116, or any combination thereof. The aggregated AUT data 158 may include data determined from AUT traffic 114 from one or more sources, such as one or more AUTs 104, from one or more proxy host devices 122, from one or more proxy access devices 124, from one or more destination devices 116, or any combination thereof. The exception data 160 may include error data indicative of detection of an intermediary module 144 within a VPN connection. For example, the exception data 160 may include a "request for renegotiation", which may be indicative of detection of the intermediary module 144. In this example, renegotiation of the VPN connection may be indicative of detection of the intermediary module 144, which may cause one of the devices to question the security of the VPN connection.

The proxy session data 134 may also include "breadcrumb" data, information associated with operation of the proxy access device 124, packet capture of data transferred by the proxy host device 122, and so forth. The breadcrumb data may include, for a particular instant or interval of time, one or more of: a current page on a website, type of network that the proxy access device 124 is connected to, quantity of data received, quantity of data transmitted, latency to the destination device 116, data throughput, received signal strength, transmit power, cost associated with data transfer on the second network 112(2), and so forth. For example, the breadcrumb data may indicate that the proxy access device 124 was connected at timestamp 201508172312030092 to webpage www.example.com/main.html using a 3G network connection with a received signal strength of 14 dBm, a transmit power of 7 dBm, data throughput of 400 Kbps, and so forth. The proxy session data 134 is thus the product of the AUT 104 operating on a real-world second network 112(2) at a desired geolocation 110. The resulting proxy session data 134 is representative of the real world, including the complexities and nuances associated therewith.

The management server 118 may obtain the proxy session data 134. For example, the proxy host device 122 may stream the proxy session data 134 to the management server 118 during the test session. In another example, the management server 118 may poll the proxy host devices 122.

Instead of, or in addition to, the proxy session data 134, one or more deployed devices 136 may provide deployed log data 138 to the management server 118. The deployed devices 136 may include, but are not limited to, smartphones, laptops, tablet computers, embedded devices, wearable computing devices, appliances, automobiles, aircraft, and so forth. The deployed device 136 may execute the AUT 104 that incorporates the SDK. The SDK on the deployed device 136 may be configured to collect deployed log data 138 during operation of the AUT 104 on the deployed device 136. The deployed log data 138 may comprise information indicative of, at a particular time, one or more of: the geolocation 110 of the deployed device 136, breadcrumb data, and other information associated with the AUT traffic 114 or the operation of the deployed device 136. For example, the user may agree to allow for the collection of the deployed log data 138 on the deployed device 136. While the user is using the AUT 104, deployed log data 138 is collected. As a result, the deployed log data 138 comprises real-world information that is obtained from actual users using the AUT 104. The geolocation 110 data may be obtained from a positioning device such as a GPS receiver, from a service such as a Wi-Fi hotspot geolocation 110 lookup, from a network provider based on signal strength or time delay at several network access points 126, and so forth.

An analysis module 140 may be configured to process the proxy session data 134 and generate report data 142. For example, the analysis module 140 may parse the proxy session data 134 to determine a first timestamp of when a first request was sent and a second timestamp of when a first response to the first request was received. Based on the first timestamp and second timestamp, a latency to fulfill the request to the second network 112(2) may be determined.

In some implementations, the report data 142 may specify one or more optimizations or possible modifications to the AUT 104. For example, the report data 142 may specify a particular portion of the AUT 104 that is generating requests with latencies over a threshold value.

The deployed log data 138 may be transmitted in real time or at specified intervals to the management server 118 or another device. For example, the AUT 104 on the deployed device 136 may be configured to send the deployed log data 138 in real time. Real time or near real time may comprise actions that take place within a threshold maximum amount of time. For example, the deployed log data 138 may be deemed to be real time if the time between collection and transmission of the data is less than or equal to 100 milliseconds (ms). In a real time or near real time configuration, the management server 118 may be able to quickly generate report data 142 indicative of a problem associated with the AUT 104. As a result, the developer 102 may be able to quickly mitigate problems, thus improving the user experience.

During testing, the developer 102 may contemporaneously acquire the proxy session data 134 and the deployed log data 138. For example, the developer 102 may use the TD 106 to execute the AUT 104 and test a different geolocation 110 while a number of users are using the deployed devices 136.

The proxy host device 122 may include one or more intermediary modules 144, which may be part of a VPN connection between a proxy access device 124 and a TD 106 or a destination device 116. The intermediary modules 144 may be implemented in hardware or software, or in a combination of hardware and software. For example, the intermediary modules 144 may be implemented as processor-executable instructions that can be executed by a processor of the proxy host device 122 and that may be used to form a VPN connection. For example, the proxy host device 122 may use the intermediary module 144 to establish a first portion of a VPN connection to the proxy access device 124(1) and the intermediary module 144, and a second portion of the VPN connection between the intermediary module 144 and the destination device 116.

In some implementations, the proxy host device 122 may support a setup mode that registers a VPN client of the proxy access device 124. The VPN IP module 204 shown in FIG. 2 may be one possible example of the VPN client. The VPN client may include a set of instructions that are executable by a processor of the proxy access device 124 or another computing device to establish and maintain a VPN connection with another device, including exchanging encryption keys and other information to establish the VPN connection. In the setup mode, the proxy host device 122 may register the VPN client by recording information about the VPN client in VPN registration data 220 in a datastore. The information about the VPN client may include identifier data that can be used by the proxy host device 122 to associate the VPN client of a device with a VPN connection. The identifier data may include a code, a serial number, or another identifier that can be used to identify the VPN client.

Figure 2:
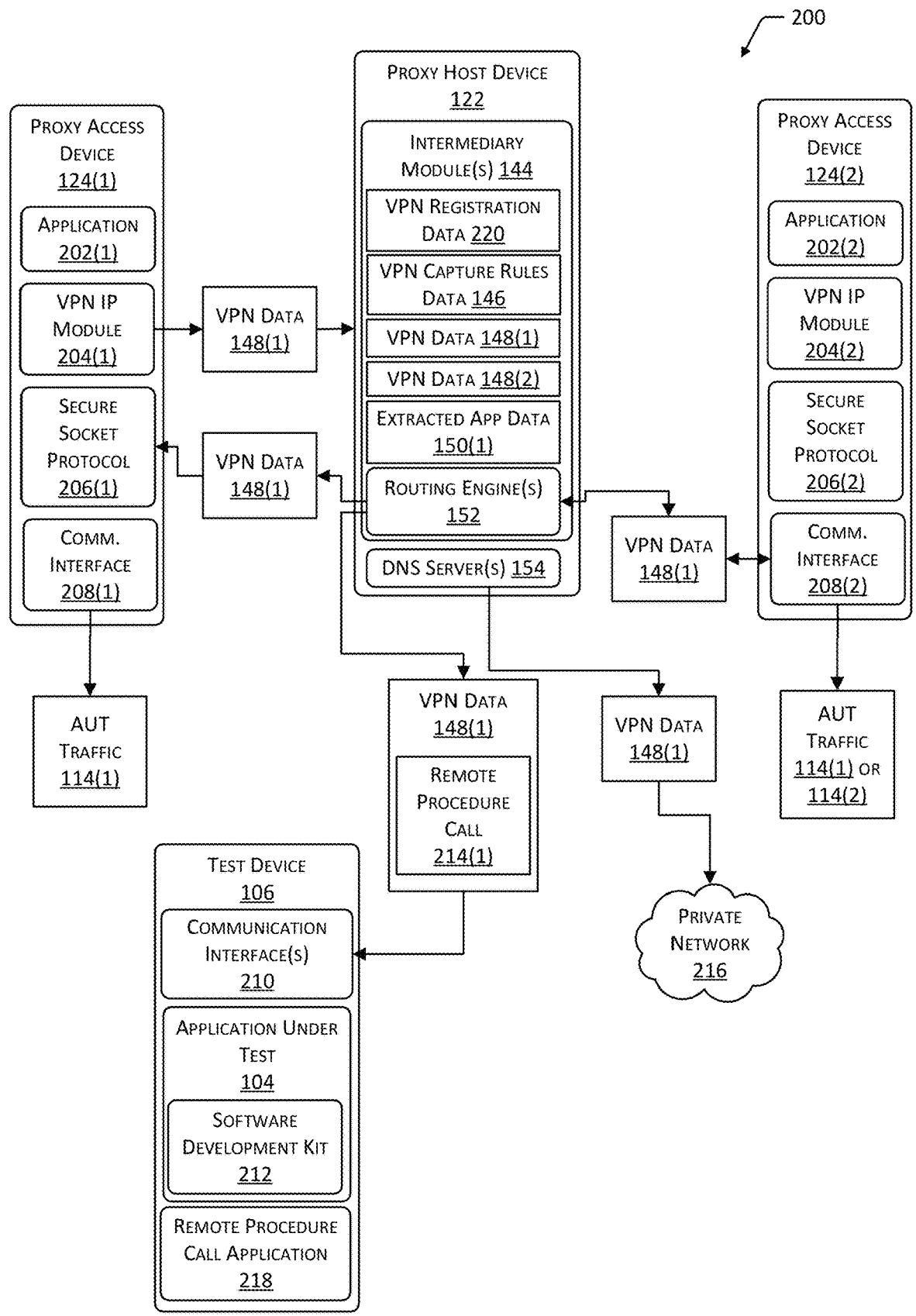
FIG. 2 depicts a block diagram of a system for testing applications that utilizes virtual private network resources, according to one implementation.

The proxy host device 122 may also support registration of a forwarding client, such as the routing engine 152 or the secure socket protocol 206 shown in FIG. 2. The forwarding client may route VPN traffic from a first device through a first portion of a VPN connection to a second device through a second portion of a VPN connection. The forwarding client may be registered by including an identifier or other information related to the forwarding client within the VPN registration data 220.

Additionally, if applicable, the proxy host device 122 may register a remote procedure call (RPC) application 218 as shown in FIG. 2. The RPC application 218 may be installed on one or more proxy access devices 124, on one or more test devices 106, or on the proxy host device 122. Data related to the RPC application may be added to the VPN registration data 220. In FIG. 2, the RPC application 218 is depicted as an application installed on the test device 106; however, other implementations are also possible.

In one possible example, the VPN registration data 220 may include one or more of first identifier data associated with the VPN IP module 204, second identifier data associated with one of the routing engine 152 or the secure socket protocol 206, and third identifier data associated with the RPC application 218. Other implementations are also possible.

In some implementations, the proxy host device 122 may activate the VPN client, the forwarding client, and the RPC application 218 and cause them to enter a standby mode. It should be appreciated that the proxy host device 122 may register the software elements by triggering instantiation of the software components and by linking them in a session table. The software elements may be linked by identifiers and other information within the VPN registration data 220, which may include the session table. The standby mode may include a low-power or idle state in which certain inputs may be monitored and in which detection of certain inputs may trigger a transition from the low-power or idle state to an operating state. The proxy host device 122 may also install a root certificate on the proxy access devices 124 using the operating system (OS) application programming interfaces (APIs), mobile device management (MDM) security software, or any combination thereof. In some instances, the OS APIs or the MDM security software may generate an alert to a user on first run for some manual steps, which manual steps can be automated with system automation software. The proxy host device 122 may then send a start command to start the intermediary module 144 and put the intermediary module 144 into a standby mode. The proxy host device 122 may then send one or more control signals to the proxy access device 124 to establish routing rules.

Once the setup mode is complete, the start command to start network routing and capture may be instantaneous. For example, in response to a start command, the intermediary module 144 may utilize the registered VPN IP module 204, the routing engine 152, and the RPC application 218 to capture VPN data 148. The setup mode allows the proxy host device 122 to prepare the VPN IP module 204, the RPC application 218, and the routing engine 152 for operation in advance of the VPN request, which enables a synchronization feature that allows for network packet capture in conjunction with other data capture functionality. Since some low-level packet captures in the operating system kernel typically cannot be edited after initialization, the setup mode enables the proxy host device 122 to start network packet capture as close as possible with the other data captures so that the captured data can be synchronized so that the network data capture and the other captured data may be correlated.

The intermediary module 144 may include VPN capture rules data 146, which may include a list of host-port pairs that may be ignored by the intermediary module 144. The list of host-port pairs may define host-port pairs that are excluded or ignored by the intermediary module 144 during formation of a VPN connection. The host-port pairs may be defined by the developer 102 or may be determined during testing, based on connection errors indicative of detection of the intermediary module 144 by at least one of the first device or the second device of the VPN connection. The connection errors may include protocol errors, VPN negotiation requests, and other indicia of a problem, which may indicate that the intermediary module 144 has been detected or that the security of the VPN connection has been compromised.

The intermediary module 144 may determine VPN data 148 from the VPN connection. For example, the VPN data 148 may include data sent through the VPN connection as well as data about the VPN connection, such as security protocol information, throughput data, other information, or any combination thereof. Further, the intermediary module 144 may determine extracted application data 150, which may include information about the functioning of an application under test (AUT) 104. For example, the extracted application data 150 may include latency information and other data that can be used to determine one or more performance attributes associated with the AUT 104.

In some implementations, the intermediary modules 144 may include a routing engine 152, which may receive data from the proxy access device 124 through a first portion of a VPN connection and which may determine routing information for forwarding the received data. For example, the intermediary module 144 may receive first VPN data 148 from a first proxy access device 124(1) through a first portion of a VPN connection. The routing engine 152 may determine forwarding information for sending the first VPN data 148 to the destination device 116 through the VPN connection. For example, the routing engine 152 may determine whether to send the VPN data 148 to the first proxy access device 124(1), to a second proxy access device 124(2), or to the network 112(1). In some implementations, the routing engine 152 may provide the VPN data 148 to one or more domain name service (DNS) servers 154, which may route the VPN data 148 to another network 112, such as a private backbone network. Other implementations are also possible.

In some implementations, the proxy host device 122 may capture VPN data 148 from a VPN connection between the proxy access device 124(1) and the destination device 116. For example, the intermediary module 144 may receive AUT traffic 114(1) including the VPN data 148(1) through a first portion of the VPN connection between the proxy access device 124(1) and the intermediary module 144. The intermediary module 144 may determine VPN data 148 and may extract application data from the AUT traffic 114(1) to produce extracted application data 150(1). The intermediary module 144 may provide the VPN data 148(1) to the routing engine 152 for routing to the destination device 116. In this example, the routing engine 152 may direct the AUT traffic 114(1) including the VPN data 148(1) and extracted application data 150(1) to the destination device 116 through the network 112(1). The AUT traffic 114(1), the VPN data 148(1), and the extracted application data 150(1) may be provided to the management server 118 through the network 112(1) for storage and subsequent analysis using the analysis module 140. In some implementations, the analysis module 140 may inspect VPN protocols and perform a deeper analysis of AUT traffic 114. Other implementations are also possible.

In some implementations, the intermediary module 144 may determine one or more errors associated with the VPN connection. The errors may include an "unexpected error" message, a bad record Media Access Control (MAC) address error, a record overflow error, a decryption failed error, a decompression error, a handshake error, a certificate error, an illegal parameter error, an access error, a decoding error, a decryption error, a protocol version error, an insufficient security error, an internal error, a user-canceled error, a "no renegotiation" error, an unsupported extension error, another error, or any combination thereof. In some implementations, the errors may also include unexpected delays in receipt of signals, decode errors, a request for renegotiation, or other errors. Such errors may be indicative of detection of the presence of the intermediary module 144 within the VPN connection. Accordingly, in response to such detection, the intermediary module 144 may stop capturing VPN data 148 and may add the host-port pair to a host-port pair exception list. Other implementations are also possible.

FIG. 2 depicts a block diagram of a system 200 for testing applications that utilize virtual private network resources, according to one implementation. The system 200 may be an implementation of the system 100 of FIG. 1.

The system 200 may include a proxy host device 122, which may be communicatively coupled to a first proxy access device 124(1), a second proxy access device 124(2), a TD 106, and a private network 216. The private network 216 may be a private backbone network that may be internal to an organization.

The proxy access device 124(1) may be a smartphone or other computing device executing an application 202(1), which may be an application under test, such as the AUT 104 in FIG. 1. The proxy access device 124(1) can include a VPN IP module 204(1), which may be configured to direct VPN data 148(1) to the proxy host device 122. In some implementations, the VPN IP module 204 may establish a VPN connection with a second proxy access device 124(2) through one or more intermediary modules 144 of the proxy host device 122.

The proxy access device 124(1) may also include a secure socket protocol 206(1), which may receive VPN data 148(1) from the proxy host device 122. The secure socket protocol 206(1) may utilize secure socket layer (SSL) protocols for encrypted transmission of information through a network 112. The proxy access device 124 may further include one or more communication interfaces 208(1), which may forward AUT traffic 114(1) to the network 112(1) or to a network access point 126 (in FIG. 1) via a cellular connection.

The proxy host device 122 may include one or more intermediary modules 144, which may be used to form a VPN connection between devices with the intermediary module 144 as part of the VPN connection. In one possible example, the intermediary module 144 may operate as a man-in-the-middle type of component, which may receive VPN data 148 from a first proxy access device 124(1), determine the VPN data 148 and other information, and send the VPN data 148 to the second proxy access device 124(2) through the VPN connection. In some implementations, the intermediary modules 144 may include VPN capture rules data 146, which may include a list of host-port pairs. In some implementations, in response to a VPN request from the first proxy access device 124(1), the intermediary module 144 may determine a host-port pair from the VPN request. The host-port pair may include a host name and a port number. The intermediary module 144 may compare the determined host-port pair to the list of host-port pairs of the VPN capture rules data 146. If the host-port pair of the VPN request is included in the list, the intermediary module 144 may forward the VPN request to the second proxy access device 124(2) and does not capture VPN data 148 associated with the VPN connection. The proxy host device 122 may still capture session data, which can be used to measure throughput and other performance-related attributes.

If the host name and port number are not included in the list of host-port pairs of the VPN capture rules data 146, the intermediary module 144 may facilitate the VPN connection between the first proxy access device 124(1) and the second proxy access device 124(2) with the intermediary module 144 as part of the VPN connection. In this instance, the intermediary module 144 may capture VPN data 148 and extracted application data 150. The VPN data 148 may then be provided to the routing engine 152. The routing engine 152 may determine a route for sending the VPN data 148(1) to the second proxy access device 124(2).

For example, the routing engine 152 may send the VPN data 148(1) to a secure socket protocol 206(1) of the proxy access device 124(1). For example, the secure socket protocol 206(1) may route the received VPN data 148(1) to a communication interface 208 for transmission of the AUT traffic 114(1), which may include the VPN data 148(1). In this example, the secure socket protocol 206(1) may route the VPN data 148(1) to the communication interface 208(1), allowing the VPN data 148(1) to be sent through the network access point 126.

In another example, the routing engine 152 may route the VPN data 148(1) to a communication interface 208(2) of the second proxy access device 124(2). The second proxy access device 124(2) may send AUT traffic 114 through the network 112(1). In an example, the second proxy access device 124(2) may forward the AUT traffic 114(1) including the VPN data 148(1) to a destination device, such as the destination device 116 in FIG. 1.

In still another example, the routing engine 152 may send AUT traffic 114(2) to the proxy access device 124(1) through the communication network 112(1). For example, the proxy access device 124(2) may receive VPN data 148(1) from the proxy access device 124(1) and may be send VPN data 148(2) to the proxy access device 124(1) through the network 112(1).

In another example, the routing engine 152 may send VPN data 148(1) to a communication interface 210 of a TD 106. The TD 106 may include the AUT 104 including a software development kit (SDK) 212. In this example, the VPN data 148(1) may include a remote procedure call 214(1), which may cause the TD 106 to perform a particular operation. Other implementations are also possible.

In still another example, the routing engine 152 may provide the VPN data 148(1) to the DNS server 154, which may route the VPN data 148(1) to a private network 216. In some implementations, the private network 216 may include a secure network associated with a particular organization. Other implementations are also possible.

The intermediary modules 144 may be configured to determine an error in the formation of a VPN connection or to detect an error in the VPN connection, the VPN data 148, or both. The errors may include an "unexpected error" message, a bad record Media Access Control (MAC) address error, a record overflow error, a decryption failed error, a record overflow error, a decompression error, a handshake error, a certificate error, an illegal parameter error, an access error, a decoding error, a decryption error, a protocol version error, an insufficient security error, an internal error, a user-canceled error, a no renegotiation error, an unsupported extension error, another error, or any combination thereof. In some implementations, the errors may also include unexpected delays in receipt of signals, decode errors, a request for renegotiation, or other errors. Such errors may be indicative of detection of the presence of the intermediary module 144 within the VPN connection. In some implementations, such errors may also be indicative of protocol version errors or other errors, which may require modification by a developer.

In response to detecting the error, the intermediary modules 144 may be configured to stop capturing VPN data 148 from the VPN connection. Further, the intermediary module 144 may store a marker in a data store indicating that the presence of the intermediary module 144 may have been detected by the first proxy access device 124(1) or the second proxy access device 124(2). The intermediary module 144 may determine a host-port pair associated with the VPN connection and may store the host-port pair in a list of host-port pairs for exclusion from VPN capture. In some implementations, the intermediary module 144 may establish a VPN connection between a first proxy access device 124(1) and a second proxy access device 124(2) and then capture VPN data 148 and session data. If an error is detected, the intermediary module 144 stops capturing the VPN data 148 and stores the host name and port number of the VPN connection in the host-port pair list. Subsequently, if a VPN request is received that includes the host name and the port number, the intermediary module 144 may establish the VPN connection without intervening in the VPN connection. The process may be repeated, storing a host-port pair in the exclusion list each time, until data can be transferred between the first proxy access device 124(1) and the second proxy access device 124(2) without encountering an error.

In some implementations, the proxy host device 122 may support a setup mode that registers the VPN IP module 204, which is a VPN client of the proxy access device 124. The VPN IP module 204 may include a set of instructions that are executable by a processor of the proxy access device 124 or another computing device to establish and maintain a VPN connection with another device. The VPN IP module 204 may cause the proxy access device 124(1) to exchange encryption keys and other information with a second device, such as the test device 106, a second proxy access device 124(2), or another device to establish the VPN connection.

In the setup mode, the proxy host device 122 may register the VPN IP module 204(1) by recording information about the VPN IP module 204(1) in VPN registration data 220 in a datastore. The information about the VPN IP module 204(1) may include an identifier that can be used by the proxy host device 122 to associate the VPN IP module 204(1) of the proxy access device 124(1) with a VPN connection. In some implementations, the identifier may include a session identifier or other identifying information, an encryption key, other information, or any combination thereof.

The proxy host device 122 may also support registration of the routing engine 152 or the secure socket protocol 206 shown in FIG. 2, which may operate as forwarding clients. The routing engine 152 or the secure socket protocol 206 may route VPN traffic from a first device through a first portion of a VPN connection to a second device through a second portion of a VPN connection. The routing engine 152 or the secure socket protocol 206 may be registered by including identifier data or other information related to the routing engine 152 or the secure socket protocol 206 within the VPN registration data 220. The identifier data may include a code, a serial number, or another identifier that can be used to identify the VPN client.

Additionally, if applicable, the proxy host device 122 may register the remote procedure call (RPC) application 218. The RPC application 218 may be installed on one or more proxy access devices 124, on one or more test devices 106, or on the proxy host device 122. Data related to the RPC application 218 may be added to the VPN registration data 220. In FIG. 2, the RPC application 218 is depicted as an application installed on the test device 106. The RPC application 218 may be registered by including an identifier or other information related to the RPC application 218 within the VPN registration data 220.

In one possible example, the VPN registration data 220 may include one or more of first identifier data associated with the VPN IP module 204, second identifier data associated with one of the routing engine 152 or the secure socket protocol 206, and third identifier data associated with the RPC application 218. Other implementations are also possible.

In some implementations, the proxy host device 122 may activate the VPN IP module 204, the routing engine 152 or the secure socket protocol 206, and the RPC application 218 and cause them to enter a standby mode in which they wait for a signal to begin operating. It should be appreciated that the proxy host device 122 may register the software elements by triggering instantiation of the software components and by linking them in a session table within the VPN registration data 220. The standby mode may include a low-power or idle state in which certain inputs may be monitored and in which detection of certain inputs may trigger a transition from the low-power or idle state to an operating state. In some implementations, the proxy host device 122 may also install a root certificate on the proxy access devices 124 using the operating system (OS) application programming interfaces (APIs), mobile device management (MDM) security software, or any combination thereof. In some instances, the OS APIs or the MDM security software may generate an alert to a user on first run for some manual steps, which manual steps can be automated with system automation software. The proxy host device 122 may then send a start command to start the intermediary module 144 and put the intermediary module 144 into a standby mode. The proxy host device 122 may then send one or more control signals to the proxy access device 124 to establish routing rules.

Once the setup mode is complete, the start command to start network routing and capture may be instantaneous. For example, in response to a start command, the intermediary module 144 may utilize the registered VPN IP module 204, the routing engine 152 or the secure socket protocol 206, and the RPC application 218 to capture VPN data 148. The setup mode allows the proxy host device 122 to prepare the VPN IP module 204, the RPC application 218, the routing engine 152, and the secure socket protocol 206 for operation in advance of the VPN request, which enables a synchronization feature that allows for network packet capture in conjunction with other data capture functionality. Since some low-level packet captures in the OS kernel typically cannot be edited after initialization, the setup mode enables the proxy host device 122 to start network packet capture as close as possible with the other data capture operations. By capturing network packets from the outset of the VPN capture operations, the captured packet data can be correlated to the network data capture and the other captured data.

Figure 3:
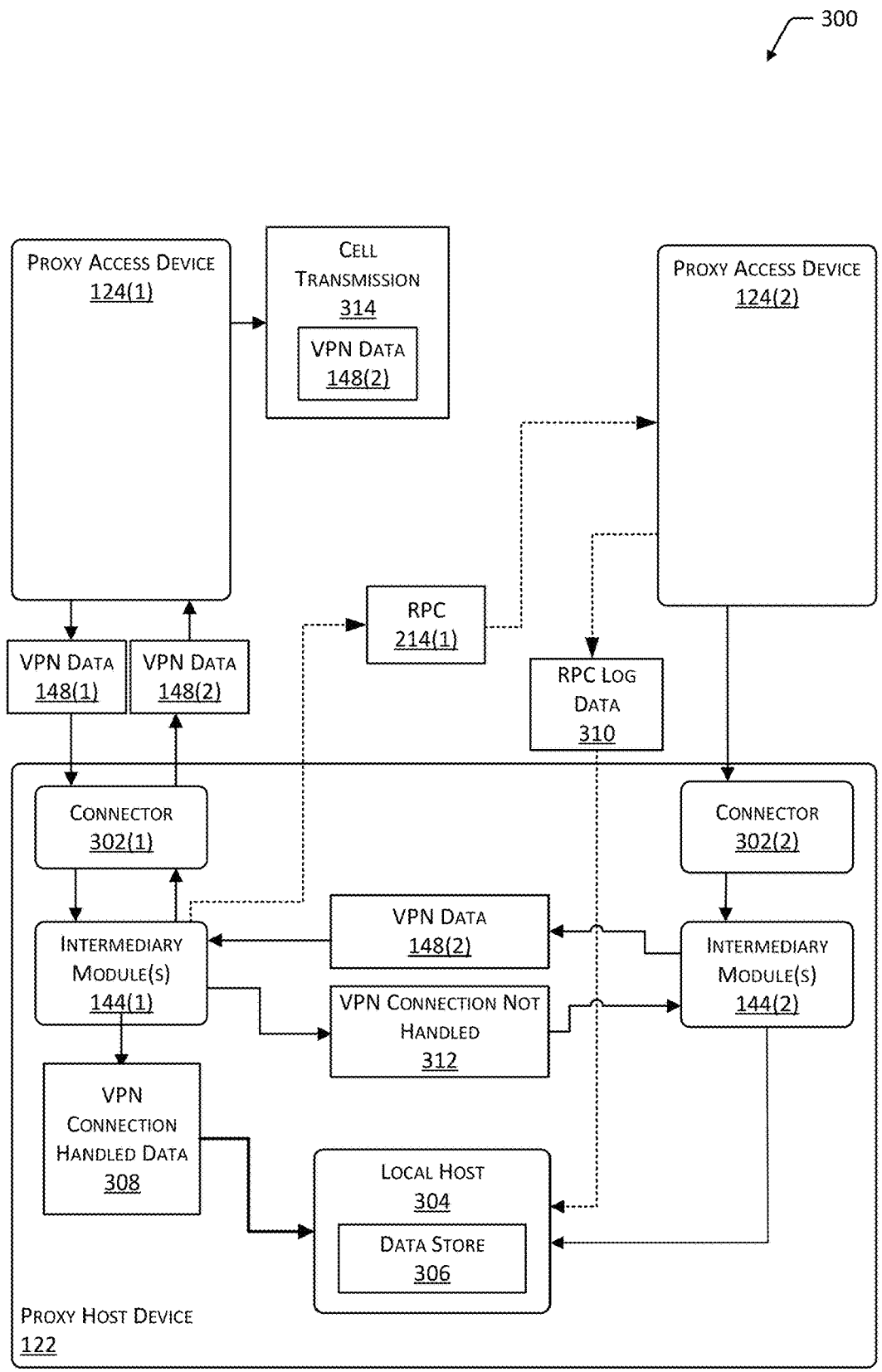
FIG. 3 depicts a block diagram of a system including a proxy host device for testing applications that utilize virtual private network resources, according to one implementation.

FIG. 3 depicts a block diagram of a system 300 including a proxy host device 122 for testing applications that utilize virtual private network resources, according to one implementation. The proxy host device 122 may be tethered to or otherwise connected to one or more proxy access devices 124, including the proxy access device 124(1) and the proxy access device 124(2).

The proxy host device 122 may include one or more connectors 302, which may be part of one or more communication interface(s). The connector 302(1) may be coupled to the proxy access device 124(1) via a first wired connection, and the connector 302(2) may be coupled to the proxy access device 124(2) through a second wired connection. For example, a user may connect the proxy access device 124(1) to the first connector 302(1) and may connect the proxy access device 124(2) to the second connector 302(2).

The proxy host device 122 may include one or more intermediary modules 144. The one or more intermediary modules 144 may be implemented in hardware, software, or a combination of hardware and software. The proxy host device 122 may include a first intermediary module 144(1) coupled to the connector 302(1), and a second intermediary module 144(2) coupled to the connector 302(2).

In some implementations, the proxy access device 124(1) may establish a VPN connection with the proxy access device 124(2) through the intermediary modules 144(1) and 144(2). For example, the intermediary module 144(1) may send a remote procedure call (RPC) 214(1) to the proxy access device 124(2) through the VPN connection. The RPC 214(1) may be sent from the proxy access device 124(1)

through the intermediary module 144(1) and through the intermediary module 144(2) to the proxy access device 124(2). Dashed lines are shown to indicate a simplified transmission path for the RPC 214.

The proxy access device 124(2) may execute the remote procedure call 214 and may generate RPC log data 310, which may be sent to a local host 304 of the proxy host device 122 for storage in a data store 306. For example, the RPC log data 310 may be data about the execution of the RPC 214 by the proxy access device 124(2). The RPC 214 may cause the proxy access device 124(2) to execute a function. For example, the RPC 214(1) may include a callback function including a transient program number, and the proxy access device 124(2) may send a callback RPC using the program number. In this example, the RPC log data 310 may include information about the execution of the RPC 214 as well as the callback information received. Other implementations are also possible.

In some implementations, the intermediary module 144(2) may send VPN data 148(2) to the intermediary module 144(1), which may forward the VPN data 148(2) to the proxy access device 124(1) via the connector 302(1). In some implementations, if the VPN connection is established without the intermediary module 144(1) being detected, VPN connection handled data 308 is provide to the local host 304 for storage in the data store 306. For example, the intermediary module 144(1) may establish a first VPN connection with a first device and a second VPN connection with a second device. The first device and the second device may then communicate through the first VPN connection and the second VPN connection, and the intermediary module 144(1) may capture VPN data 148, which may include protocol information as well as data sent through the first VPN connection and the second VPN connection. Otherwise, an error is returned from the intermediary module 144(1) to the intermediary module 144(2) indicating that the VPN connection was not handled 312.

Figure 4:
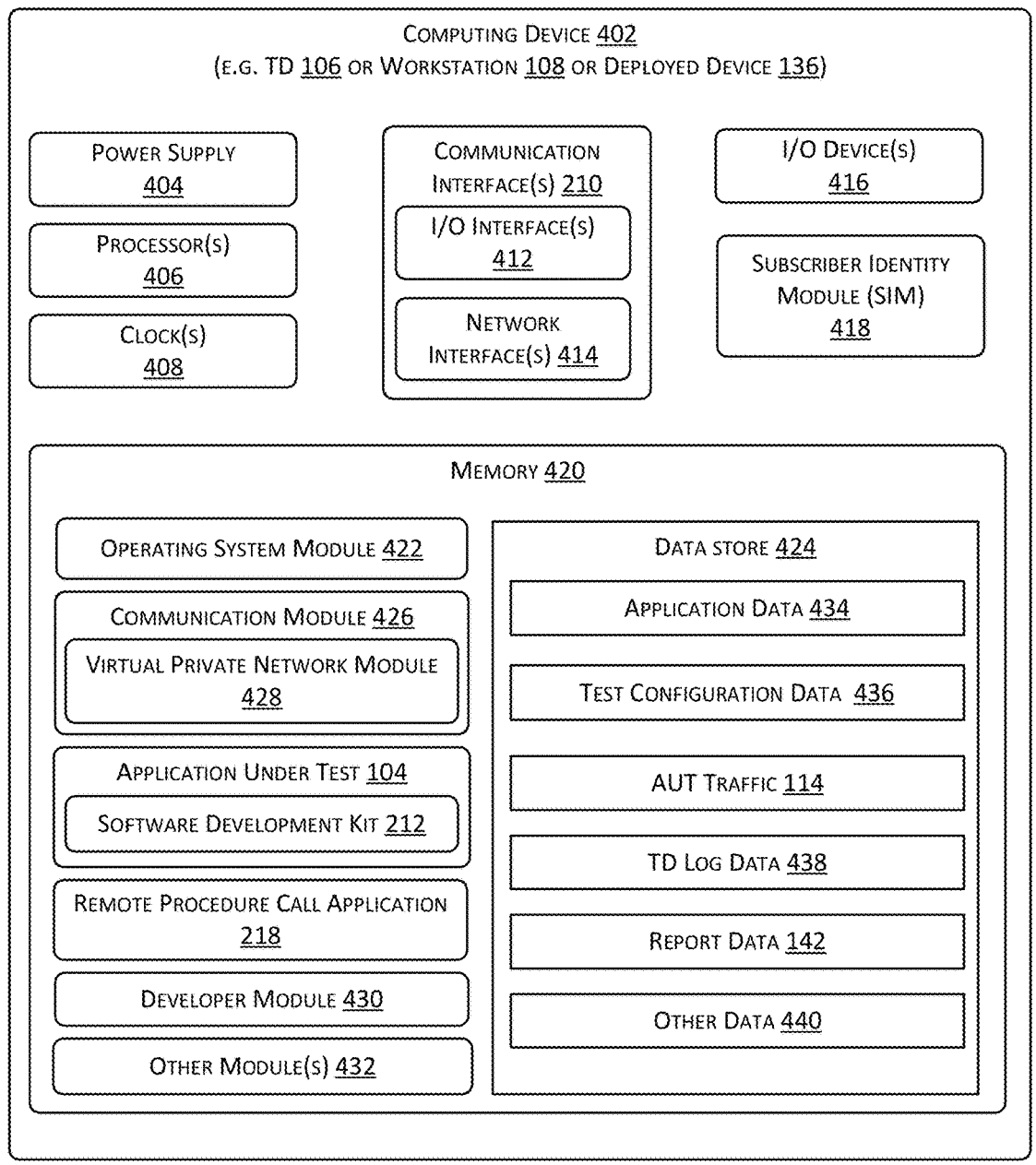
FIG. 4 depicts a block diagram of a computing device such as a test device, workstation, or deployed device within the scope of the present disclosure, according to one implementation.

FIG. 4 is a block diagram 400 illustrating a computing device 402 within the scope of the present disclosure. The computing device 402 may include one or more TDs 106, workstations 108, deployed devices 136, or other devices. Any type of computing device 402 and any number of networked computing devices may perform the implementations described herein.

One or more power supplies 404 may be configured to provide electrical power suitable for operating the components of the computing device 402. In some implementations, the power supply 404 may include a rechargeable battery, fuel cell, photovoltaic cell, power conditioning circuitry, and so forth.

The computing device 402 may include one or more hardware processor(s) 406 (processors) configured to execute one or more stored instructions. The processor(s) 406 may include one or more cores. One or more clocks 408 may provide information indicative of date, time, ticks, and so forth. For example, the processor(s) 406 may use data from the clock 408 to generate a timestamp, trigger a preprogrammed action, and so forth.

The computing device 402 may include one or more communication interfaces 210, such as input/output (I/O) interfaces 412, network interfaces 414, and so forth. The communication interfaces 210 may enable the computing device 402, or components of the computing device 402, to communicate with other devices or components of the computing device 402. The I/O interfaces 412 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 412 may couple to one or more I/O devices 416. The I/O devices 416 may include any manner of input device or output device associated with the computing device 402. For example, I/O devices 416 may include touch sensors, keyboards, mouse devices, microphones, image sensors (e.g., cameras), scanners, displays, speakers, haptic devices, printers, positioning devices, and so forth. The positioning device may comprise one or more of a satellite radionavigation system, inertial navigation system, terrestrial radionavigation system, or other device configured to generate data indicative of the geolocation 110. For example, the satellite radionavigation system may comprise a Global Positioning System (GPS) receiver, the terrestrial radionavigation system may utilize information from the network access points 126, and so forth. In some implementations, the I/O devices 416 may be physically incorporated with the computing device 402 or may be externally placed.

The network interfaces 414 may be configured to provide communications between the computing device 402 and other devices, such as the I/O devices 416, routers, access points, and so forth. The network interfaces 414 may include devices configured to couple to one or more networks 112 including local area networks (LANs), WLANs, wide area networks (WANs), WWANs, and so forth. For example, the network interfaces 414 may include devices compatible with Ethernet, Wi-Fi, Bluetooth, ZigBee, Z-Wave, 3G, 4G, LTE, and so forth.

The computing device 402 may include one or more buses or other internal communications hardware or software that allows for the transfer of data between the various modules and components of the computing device 402.

The computing device 402 may include a subscriber identity module (SIM) 418. For example, the TD 106 and the deployed device 136 may include SIMs 418. The SIM 418 may comprise a non-transitory computer-readable storage media that may store information such as an international mobile subscriber identity (IMSI) number, cryptographic keys, integrated circuit card identifier (ICCID), contact information, or other data. The SIM 418 may be used by the network interface 414 for communication with one or more of the networks 112. For example, the IMSI and cryptographic keys stored in the SIM 418 may be retrieved and used to establish communication with a WCDN.

As shown in FIG. 4, the computing device 402 may include one or more memories 420. The memory 420 may include one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 420 may provide storage of computer-readable instructions, data structures, program modules, and other data for the operation of the computing device 402. A few example modules are shown stored in the memory 420, although the same functionality may alternatively be implemented in hardware, firmware, or as a system on a chip (SoC).

The memory 420 may include one or more operating system (OS) modules 422. The OS module 422 may be configured to manage hardware resource devices such as the I/O interfaces 412, the network interfaces 414, the I/O devices 416, and to provide various services to applications or modules executing on the processors 406. The OS module 422 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; the Mac OS or iOS promulgated by Apple Inc. of Cupertino, Calif., USA; or other operating systems.

A data store 424 and one or more of the following modules may also be stored in the memory 420. The modules may be executed as foreground applications, background tasks, daemons, and so forth. The data store 424 may use a flat file, database, linked list, tree, executable code, script, or other data structure to store information. In some implementations, the data store 424 or a portion of the data store 424 may be distributed across one or more other devices including other computing devices 402, network attached storage devices, and so forth.

A communication module 426 may be configured to establish communications with one or more other devices using one or more of the communication interfaces 210. Communications may be authenticated, encrypted, and so forth. For example, the communication module 426 may utilize digital certificates to authenticate the identity of devices involved in the communication. For example, the communication module 426 may be configured to establish a virtual private network (VPN) connection or tunnel with the proxy host device 122 using a VPN module 428. The VPN module 428 may be a hardware module or a software module. Further, the proxy host device 122 may register information about the VPN module 428 during a setup mode.

The memory 420 may store the AUT 104. As described above, in some implementations, the AUT 104 may incorporate at least a portion of a software development kit (SDK) 212. Elements of the SDK 212 may be configured to execute on the one or more hardware processors 406. These elements may execute within a user space, as compared to a kernel space, of an operating system executing on the computing device 402. For example, the AUT 104 and the elements of the SDK 212 may execute with privileges of a user account, with the first user account having privileges within the OS that are lesser than a root account, superuser, administrator, or other types of elevated accounts.

The SDK 212 may be configured to direct the AUT traffic 114 to and from a particular network address. For example, the SDK 212 may be configurable to intercept the outbound application traffic 128 and direct that traffic to the selected proxy host device 122. In one implementation the SDK 212 may implement or call on VPN functionality, such as provided by the communication module 426. For example, the SDK 212 may issue a request to the communication module 426 to establish an encrypted tunnel to the proxy host device 122. Once established, the AUT traffic 114 may be directed through the VPN to the proxy host device 122.

The memory 420 may also include an RPC application 218, which may be accessed remotely by another device to initiate an operation. In one possible example, the RPC application 218 may include a printer spooler application, which may be initiated by another device through a network connection. In another possible example, the RPC application 218 may enable remote access and control of a device. The RPC application 218 may be remotely controlled via a control signal sent through the private network 216 to initiate an operation, to authorize a VPN connection, to perform other operations, or any combination thereof. Other implementations are also possible.

A developer module 430 may be stored in the memory 420. The developer module 430 may comprise one or more of an integrated development environment, build systems, and so forth. For example, the developer module 430 may include Xcode from Apple Inc., Android Studio from Google Inc., Gradle as promulgated at www.gradle.org, Jenkins as promulgated at www.jenkins-ci.org, Travis CI as promulgated at www.travis-ci.org, Perforce from Perforce Software, Inc., and so forth.

Other modules 432 may also be present in the memory 420. In some implementations, one or more of the modules may be stored at least in part in the memory 420 of other devices, may be executed at least in part on the other devices, and so forth. For example, one or more functions associated with the developer module 430 may execute on a server.

Various information used by the computing device 402 may be stored in the data store 424. For example, application data 434 may be data that is generated by an application executing on a TD 106, a workstation 108, or a deployed device 136. In the context of the TD 106 and the deployed device 136, the AUT 104 may generate the application data 434, which may be stored in the data store 424 and may comprise information associated with operation of modules such as the AUT 104, the developer module 430, and so forth. The application data 434 may be sent to the management server 118 in the aggregated AUT data 158.

Test configuration data 436 may also be stored in the data store 424. The test configuration data 436 may comprise information associated with the testing. For example, the test configuration data 436 may specify the second geolocation 110(2) selected by the developer 102 that will be used for network testing, network address of the proxy host device 122, credentials to access the proxy host device 122, costs associated with access to the proxy access device 124, information from the management server 118 about the proxy host device 122, proxy access device 124, and so forth. In some implementations, at least a portion of AUT traffic 114 may be stored in the data store 424.

In some implementations, such as where the computing device 402 comprises the TD 106 or the workstation 108, TD log data 438 may be stored in the data store 424. For example, the TD log data 438 may comprise information associated with debugging performed by the developer module 430 on the workstation 108.

Report data 142 may also be stored in the data store 424. For example, the management server 118 may return report data 142 to the TD 106 or the workstation 108 for presentation to the developer 102.

Other data 440 may also be stored in the data store 424. For example, the other data 440 may include one or more threshold values. For example, the threshold values may include latency times that, when exceeded, result in an alert in the report data 142. Threshold values may also include maximum values, minimum values, ranges of values, and so forth.

In different implementations, different computing devices 402 may have different capabilities or capacities. For example, a workstation 108 may have significantly more processor 406 capability and memory 420 capacity compared to the processor 406 capability and memory 420 capacity of the TD 106 or deployed device 136.

Figure 5:
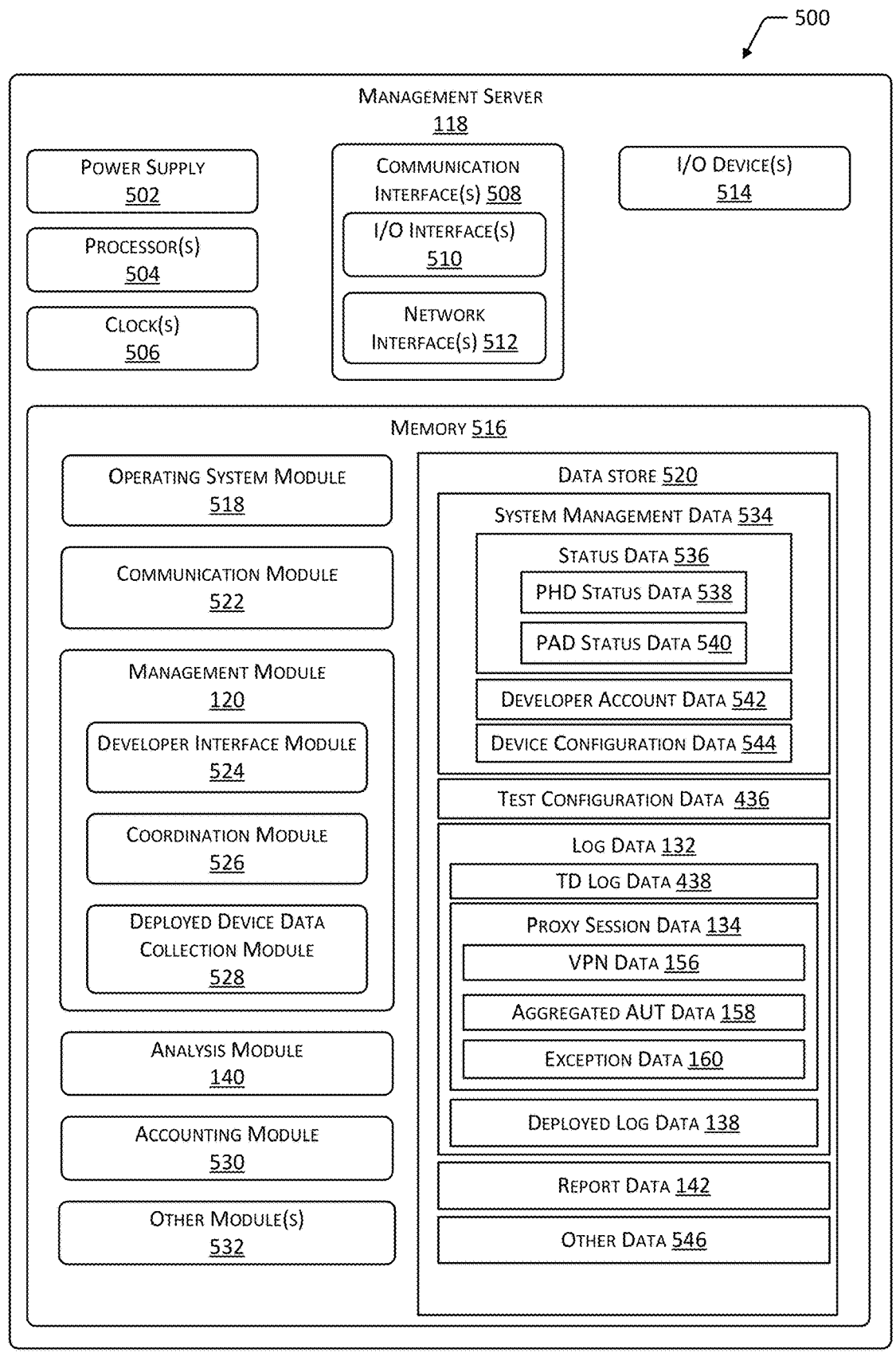
FIG. 5 depicts a block diagram of a computing device acting as a management server within the scope of the present disclosure, according to one implementation.

FIG. 5 is a block diagram 500 of a computing device acting as a management server 118 within the scope of the present disclosure, according to one implementation. The management server 118 may provide functionality such as coordinating communication between an AUT 104 and the proxy access devices 124 that are connected to proxy host devices 122.

Similar to the computing device 402 described above with regard to FIG. 4, the management server 118 may include one or more of: power supplies 502, hardware processor(s) 504 (processors), clocks 506, or communication interfaces 508. The communication interface 508 may include I/O interfaces 510, network interfaces 512, and so forth.

The I/O interface(s) 510 may couple to one or more I/O devices 514. The I/O devices 514 may include any manner of input device or output device, such as described above with regard to FIG. 4. In some implementations, the I/O devices 514 may be physically incorporated with the management server 118 or may be externally placed.

The network interfaces 512 may be configured to provide communications between the management server 118 and other devices. As described above with regard to FIG. 4, the network interfaces 512 may include devices configured to couple to one or more networks.

The management server 118 may include one or more buses or other internal communications hardware or software that allows for the transfer of data between the various modules and components of the management server 118.

As shown in FIG. 5, the management server 118 may include one or more memories 516, such as described above with regard to FIG. 4. The memory 516 may include one or more non-transitory CRSM. The memory 516 may provide storage of computer-readable instructions, data structures, program modules, and other data for the operation of the management server 118. A few example modules are shown stored in the memory 516, although the same functionality may alternatively be implemented in hardware, firmware, or as a SoC.

The memory 516 may include one or more OS modules 518, such as described above with regard to FIG. 4.

A data store 520 and one or more of the following modules may also be stored in the memory 516. The modules may be executed as foreground applications, background tasks, daemons, and so forth. The data store 520 may use a flat file, database, linked list, tree, executable code, script, or other data structure to store information. In some implementations, the data store 520 or a portion of the data store 520 may be distributed across one or more other devices including other computing devices, network attached storage devices, and so forth.

A communication module 522 may be configured to establish communications with one or more other devices using one or more of the communication interfaces 508. Communications may be authenticated, encrypted, and so forth. For example, the communication module 522 may utilize digital certificates to authenticate the identity of devices involved in the communication.

The memory 516 may store the management module 120. The management module 120 may include one or more of a developer interface module 524, coordination module 526, deployed device data collection module 528, and so forth. The analysis module 140, an accounting module 530, or other modules 532 may also be present in the memory 516.

The developer interface module 524 provides interface functionality to the developer 102 or application used by the developer 102. For example, the developer interface module 524 may present a user interface for the developer 102 to select a particular proxy access device 124 or may comprise an application programming interface (API) that the SDK 212 may use to access one or more of the functions of the management server 118. In some implementations, at least a portion of the developer interface module 524 may be provided as part of the SDK 212.

The coordination module 526 is configured to coordinate various functions of the system 100. The coordination module 526 may be configured to access system management data 534 stored in the data store 520 to direct operation of the system. The system management data 534 may include status data 536, such as proxy host device (PHD) status data 538, proxy access device (PAD) status data 540, and so forth. The PHD status data 538 may comprise information such as a network address, operational status, information indicative of installed software, version of installed software, current utilization, and so forth. The PAD status data 540 may comprise information such as make and model of the proxy access device 124, OS version of the proxy access device 124, connection status to the second network 112(2), whether the proxy access device 124 is currently in use by another AUT 104, and so forth.

The system management data 534 may also include developer account data 542. The developer account data 534 may include information such as individual account logins and passwords, billing information, usage information, and so forth.

The system management data 534 may also include device configuration data 544. The device configuration data 544 may comprise instructions, applications, modules, and so forth, that may be used to configure one or more of the proxy host device 122 or the proxy access device 124. For example, the device configuration data 544 may include one or more scripts that may be executed by the proxy host device 122 to send instructions to the proxy access device 124. These instructions may configure the proxy access device 124 to transfer data between the proxy host device 122 and the second network 112(2).

The data store 520 may also store test configuration data 436, such as described above. In some implementations, the management server 118 may generate at least a portion of the test configuration data 436. The generation of the test configuration data 436 may be based at least in part on information provided by the developer 102. For example, the developer 102 may use the developer interface module 524 to specify parameters such as different types of tests parameters, alarm limits, test thresholds, and so forth. Based on these parameters, the management module 120 may generate the test configuration data 436. In some implementations, test configuration data 436 may be modified by the developer 102, or may be generated entirely by the developer 102 or another device or entity.

Returning to the coordination module 526, the system management data 534 and test configuration data 436 may be used to provide testing functionality to the developer 102. For example, the developer 102 may use the developer interface module 524 to request testing services for the AUT 104. The coordination module 526 may assess the status data 536 to determine information such as geolocations 110, types of networks 112, and so forth, that are available for use. Based on this determination, the coordination module 526 may present information to the developer 102 by way of the developer interface module 524. For example, the information may indicate those geolocations 110 and proxy access devices 124 that are available for testing, cost associated with using those resources, and so forth.

Responsive to a selection by the developer 102, or predefined defaults, the coordination module 526 may coordinate establishment of a connection between the TD 106 and the proxy access device 124 such that AUT traffic 114 from the AUT 104 is directed through the proxy access device 124 and the second network 112(2) to reach the destination device 116. For example, responsive to the selection within a user interface by the developer 102, the AUT 104 may receive a network address and credentials associated with the proxy host device 122 at the selected second geolocation 110(2). The AUT 104 may use the network address and credentials to establish a connection with the proxy host device 122. The AUT traffic 114 may thus be exchanged directly between the AUT 104 that is executing on the TD 106 or the workstation 108 and the proxy host device 122. In another implementation, the management server 118 may act as an intermediary relaying the AUT traffic 114 between the AUT 104 and the proxy host device 122.

The coordination module 526 may be configured to acquire the log data 132. For example, the coordination module 526 may establish a connection with the proxy host device 122 to receive an ongoing stream of proxy session data 134. The stream of proxy session data 134 may be received in real time or near real time while the developer 102 is testing the AUT 104. For example, proxy session data 134 may be sent every five seconds to the management server 118.

In some implementations, the log data 132 may include the TD log data 438. For example, the SDK 212 may send the TD log data 438 to the management server 118.

The deployed device data collection module 528 may be configured to communicate with the deployed devices 136 and obtain the deployed log data 138. The deployed device data collection module 528 may be configured to receive the deployed log data 138 in real time or near real time during use of the AUT 104. For example, the deployed log data 138 may be generated while the AUT 104 executing on the deployed device 136 is exchanging AUT traffic 114 with the destination device 116 by way of a particular network 112 at a particular geolocation 110. The deployed log data 138 may be used by the management server 118 to determine if the AUT 104 is experiencing problems on the particular network 112, at the particular geolocation 110, and so forth.

As described above, the analysis module 140 may be configured to use information stored in the data store 520 to generate report data 142. For example, the analysis module 140 may analyze the log data 132 to determine if there are particular WCDNs or parts of a city where the AUT 104 experiences problems using the resources of the destination device 116.

The accounting module 530 may be configured to determine and assess charges associated with the use of the system 100, provide remuneration to operators of the proxy access devices 124, and so forth. For example, the accounting module 530 may provide the developer 102 with a cost to use the particular proxy access device 124 at a particular geolocation 110 for a certain amount of time, quantity of data transferred, and so forth. In some implementations, a user may join their mobile device to the system and allow that mobile device to act as a proxy access device 124. For example, during a time of day when the user is not otherwise using their cell phone, they may tether their cell phone to a proxy host device 122 and allow the use of that cell phone as a proxy access device 124. During such use, data associated with the user that is stored on the cell phone may be secured, other applications executing on the cell phone may be terminated, and so forth. These and other measures may be taken to safeguard the security of the data of the user, to prevent an application executing on the cell phone from affecting the results of the test, and so forth. In return for allowing this use, the user may receive remuneration. For example, where the user is a developer 102, the developer 102 may receive a credit on their account. That credit may be used to run tests using a proxy access device 124 associated with another developer 102. In other implementations, the remuneration may comprise a financial transfer such as payment in the form of currency.

In some implementations, one or more of the modules may be stored at least in part in the memory of other devices, may be executed at least in part on the other devices, and so forth. For example, one or more functions associated with the accounting module 530 may execute on another server.

Other data 546 within the data store 520 may include information such as configurations and settings associated with the management server 118 or modules thereof.

Figure 6:
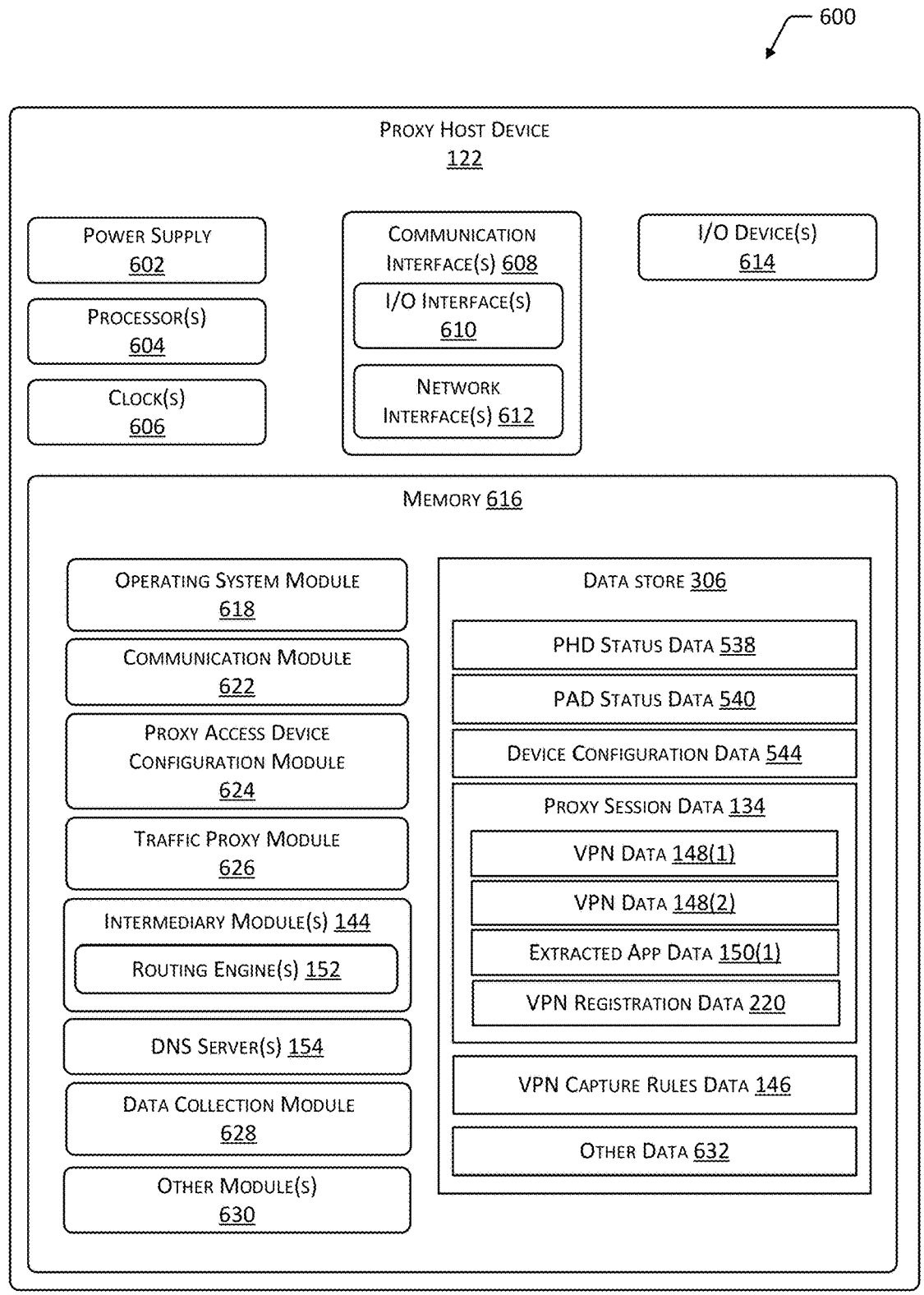
FIG. 6 depicts a block diagram of a computing device acting as a proxy host device within the scope of the present disclosure, according to one implementation.

FIG. 6 is a block diagram 600 of a computing device 402 acting as a proxy host device 122 within the scope of the present disclosure, according to one implementation. The proxy host device 122 may be implemented using a variety of different types of computing devices 402. For example, a proxy host device 122 may comprise a mini desktop computer, a tablet computer, a server, and so forth.

Similar to that described above with regard to FIG. 4, the proxy host device 122 may include one or more of: power supplies 602, hardware processor(s) 604 (processors), clocks 606, or communication interfaces 608. The communication interface 608 may include I/O interfaces 610, network interfaces 612, and so forth.

The I/O interface(s) 610 may couple to one or more I/O devices 614. The I/O devices 614 may include any manner of input device or output device, such as those described above with regard to FIG. 4. In some implementations, the I/O devices 614 may be physically incorporated with the proxy host device 122 or may be externally placed.

The network interfaces 612 may be configured to provide communications between the proxy host device 122 and other devices. As described above with regard to FIG. 4, the network interfaces 612 may include devices configured to couple to one or more networks 112.

The proxy host device 122 may include one or more buses or other internal communications hardware or software that allows for the transfer of data between the various modules and components of the proxy host device 122.

As shown in FIG. 6, the proxy host device 122 may include one or more memories 616, such as described above with regard to FIG. 4. The memory 616 may include one or more non-transitory CRSM. The memory 616 may provide storage of computer-readable instructions, data structures, program modules, and other data for the operation of the proxy host device 122. A few example modules are shown stored in the memory 616, although the same functionality may alternatively be implemented in hardware, firmware, or as a SoC.

The memory 616 may include one or more OS modules 618, such as described above with regard to FIG. 4.

A data store 306 and one or more of the following modules may also be stored in the memory 616. The modules may be executed as foreground applications, background tasks, daemons, and so forth. The data store 306 may use a flat file, database, linked list, tree, executable code, script, or other data structure to store information. In some implementations, the data store 306 or a portion of the data store 306 may be distributed across one or more other devices including other devices, network attached storage devices, and so forth.

The data store 306 may store PHD status data 538, PAD status data 540, and device configuration data 544 for one or more proxy access devices 124. The data store 306 may also store proxy session data 134, including first VPN data 148(1) associated with a first proxy access device 124(1) and second VPN data 148(2) associated with a second proxy access device 124(2) or another device. The data store 306 may also store extracted application data 150(1) from a first proxy access device 124(1). Optionally, the data store 306 may also store extracted application data 150(2) from the second proxy access device 124(2). The data store 306 may also store the VPN registration data 220, which may include identifiers, security keys, other information, or any combination thereof for the VPN IP module 204, the secure socket protocol 206, the routing engine 152, the RPC application 218, or any combination thereof. The data store 306 may also store VPN capture rules data 146, which may include decision logic rules for handling exceptions or for avoiding capture of one or more VPN sessions based on previous errors or based on an exclusions list. Other implementations are also possible.

A communication module 622 may be configured to establish communications with one or more other devices using one or more of the communication interfaces 608. Communications may be authenticated, encrypted, and so forth. For example, the communication module 622 may utilize digital certificates to authenticate the identity of devices involved in the communication. For example, the communication module 622 may be configured to establish a VPN connection or tunnel with one or more of the TD 106, the workstation 108, or the management server 118.

The memory 616 may store one or more of a proxy access device (PAD) configuration module 624, a traffic proxy module 626, a data collection module 628, or other modules 630.

The PAD configuration module 624 is configured to send one or more instructions or commands to the proxy access devices 124 that are connected to the proxy host device 122. These instructions may be provided as part of the device configuration data 544 received from the management server 118. These instructions may be designed to enable the proxy access device 124 to send and receive traffic on the second network 112(2), provide information such as the PAD status data 540, and so forth. For example, the PAD configuration module 624 may send and execute a local traffic module and a local status module to the proxy access device 124. These modules are discussed below in more detail with regard to FIG. 7. For example, the PAD configuration module 624 may utilize the Ansible software platform as developed by Michael DeHaan and promulgated at www.ansible.com.

The traffic proxy module 626 is configured to pass the AUT traffic 114 between the TD 106 that is executing the AUT 104 and the proxy access device 124. For example, where the proxy host device 122 utilizes the Linux OS, the Linux proxy service may be used. The traffic proxy module 626 may be configured to connect otherwise dissimilar types of interfaces. For example, the proxy host device 122 may use a network interface 612 to connect the first network 112(1) and a USB I/O interface 610 to connect to (or tether) the proxy access device 124. Once connected, the USB connection to the proxy access device 124 may be presented in the OS module 618 as a network interface through which traffic may be routed.

The connection or tethering between the proxy host device 122 and the proxy access device 124 may be wireless in some implementations. For example, the proxy host device 122 and proxy access device 124 may be in communication with one another using a Bluetooth wireless interface.

The data collection module 628 may be configured to obtain one or more of the PHD status data 538, the PAD status data 540, the proxy session data 134, or other data. For example, the data collection module 628 may obtain packet captures of the AUT traffic 114 that is being transferred between the proxy host device 122 and the proxy access device 124. Packet captures may be included in the proxy session data 134. For example, the TCPDUMP library promulgated by www.tcpdump.org may be used to acquire the packet captures. As described above, the proxy session data 134 may be sent to one or more of the management server 118, the TD 106, the workstation 108, or other devices.

One or more of the modules may execute in the user space of the OS module 618. For example, one or more of the proxy access device configuration module 624, the traffic proxy module 626, or the data collection module 628 may execute using the account privileges associated with a user space of the OS module 618. In comparison, the OS module 618 may provide for accounts that provide additional privileges or levels of access, such as a root account, superuser, administrator, and so forth.

In some implementations, one or more of the modules may be stored at least in part in the memory 616 of other devices, may be executed at least in part on the other devices, and so forth.

Other data 632 within the data store 306 may include information such as configurations and settings associated with the proxy host device 122 or modules thereof.

Figure 7:
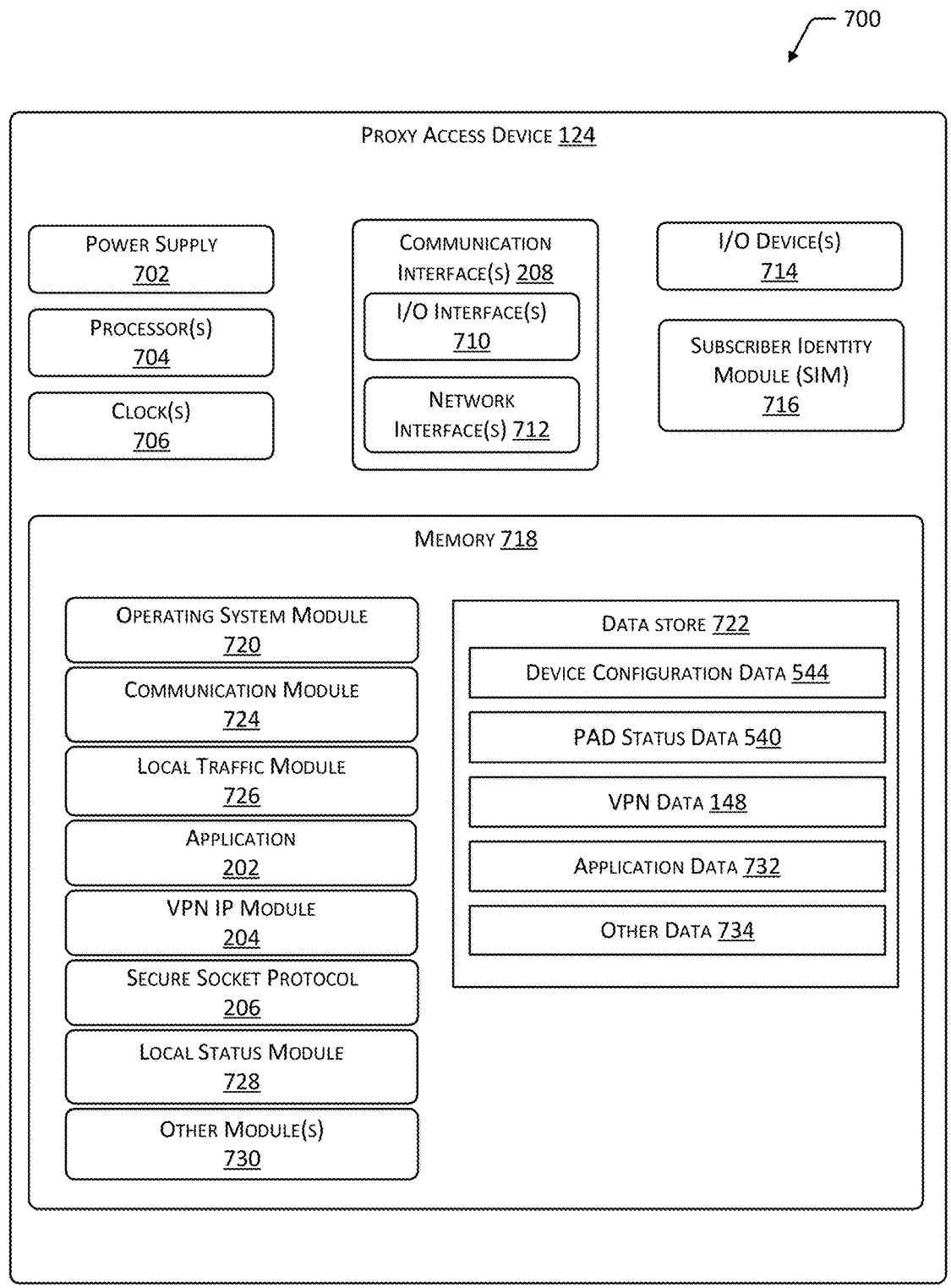
FIG. 7 is a block diagram of a computing device acting as a proxy access device within the scope of the present disclosure, according to one implementation.

FIG. 7 is a block diagram 700 of a computing device acting as a proxy access device 124 within the scope of the present disclosure, according to one implementation. For example, the proxy access device 124 may comprise a cellular phone handset that supports data transmission.

Similar to that described above with regard to FIG. 4, the proxy access device 124 may include one or more of: power supplies 702, hardware processor(s) 704 (processors), clocks 706, or communication interfaces 208. The communication interface 208 may include I/O interfaces 710, network interfaces 712, and so forth.

The I/O interface(s) 710 may couple to one or more I/O devices 714. The I/O devices 714 may include any manner of input device or output device, such as described above with regard to FIG. 4. In some implementations, the I/O devices 714 may be physically incorporated with the proxy access device 124 or may be externally placed.

The network interfaces 712 may be configured to provide communications between the proxy access device 124 and other devices. As described above with regard to FIG. 4, the network interfaces 712 may include devices configured to couple to one or more networks 112.

The proxy access device 124 may include one or more buses or other internal communications hardware or software that allows for the transfer of data between the various modules and components of the proxy access device 124. Further, the proxy access device 124 may include a SIM 716, such as described above with regard to FIG. 4.

As shown in FIG. 7, the proxy access device 124 may include one or more memories 718, such as described above with regard to FIG. 4. The memory 718 may include one or more non-transitory CRSM. The memory 718 may provide storage of computer-readable instructions, data structures, program modules, and other data for the operation of the proxy access device 124. A few example modules are shown stored in the memory 718, although the same functionality may alternatively be implemented in hardware, firmware, or as a SoC.

The memory 718 may include one or more OS modules 720, such as described above with regard to FIG. 4. For example, the OS module 720 may implement the Apple iOS or the Google Android operating systems.

A data store 722 and one or more of the following modules may also be stored in the memory 718. The modules may be executed as foreground applications, background tasks, daemons, and so forth. The data store 722 may use a flat file, database, linked list, tree, executable code, script, or other data structure to store information. In some implementations, the data store 722 or a portion of the data store 722 may be distributed across one or more other devices including other computing devices, network attached storage devices, and so forth.

A communication module 724 may be configured to establish communications with one or more other devices using one or more of the communication interfaces 208. Communications may be authenticated, encrypted, and so forth. For example, the communication module 724 may utilize digital certificates to authenticate the identity of devices involved in the communication.

The memory 718 may store one or more of a local traffic module 726, a local status module 728, or other modules 730. The local traffic module 726 is configured to accept traffic from the first communication interface 208(1) and pass that traffic to a second communication interface 208(2). For example, the local traffic module 726 may be configured to direct AUT traffic 114 between a USB I/O interface 710 and a network interface 712 that connects to the second network 112(2).

In some implementations, the local traffic module 726 may be configured to close, terminate, stop, or shut down other modules executing on the processor 704 that are not required for data transfer. For example, the local traffic module 726 may close any user applications and so forth. In some implementations, the local traffic module 726 may block or otherwise restrict the transmission of data to the second network 112(2) that is not associated with the testing of the AUT 104.

The local status module 728 may be configured to acquire the PAD status data 540. For example, the local status module 728 may interrogate the OS module 720, communication interfaces 208, and so forth, to gather information such as processor usage, memory usage, network connection status, received signal strength, transmit power, and so forth. The local status module 728 may provide the PAD status data 540 to the proxy host device 122 via the I/O interface 710.

One or more of the modules may execute in the user space of the OS module 720. For example, one or more of the local traffic module 726 or local status module 728 may execute using the account privileges associated with a user space of the OS module 720. In comparison, the OS module 720 may provide for accounts that provide additional privileges or levels of access, such as a root account, superuser, administrator, and so forth.

As described above, the proxy host device 122 may configure the proxy access device 124. For example, the proxy host device 122 may send the device configuration data 544 to the proxy access device 124 using the USB I/O interface 710. The device configuration data 544 may include the local traffic module 726, the local status module 728, or settings associated therewith. For example, during configuration, the proxy host device 122 may install the local traffic module 726 and local status module 728 on the proxy access device 124.

The memory 718 may include an application 202, which may be an application under test (AUT) 104. The application 202 may generate AUT traffic 114. Further, the memory 718 may include a VPN IP module 204, which may be configured to request and establish a VPN connection between the proxy access device 124 and another device, such as another proxy access device 124(2), a TD 106, or a destination device 116. The memory 718 may further include a secure socket protocol 206, which may be configured to receive data from a proxy host device 122 and to send the data to the communication module 724, which may send the data to a communication interface 208 for transmission. Other implementations are also possible.

The other modules 730 in the memory 718 may provide other functions. For example, where the proxy access device 124 is being provided by an end user for participation in the system 100, the other modules 730 may include applications installed by the end user on the proxy access device 124.

In some implementations, one or more of the modules may be stored at least in part in the memory 718 of other devices, may be executed at least in part on the other devices, and so forth.

Other data 734 within the data store 722 may include information such as configurations and settings associated with the proxy access device 124 or modules thereof. The data store 722 may include device configuration data 544 and proxy access device (PAD) status data 540. The data store 722 can further include VPN data 148 and application data 732, which may be determined from the AUT traffic 114.

In some implementations, the proxy access device 124 may perform one or more of the functions associated with the proxy host device 122. For example, the proxy access device 124 may implement one or more of the PAD configuration module 624, the traffic proxy module 626, or the data collection module 628, which are described with respect to the proxy host device 122 but which may be implemented by the proxy access device 124. Other implementations are also possible.

Illustrative Processes

Figure 8:
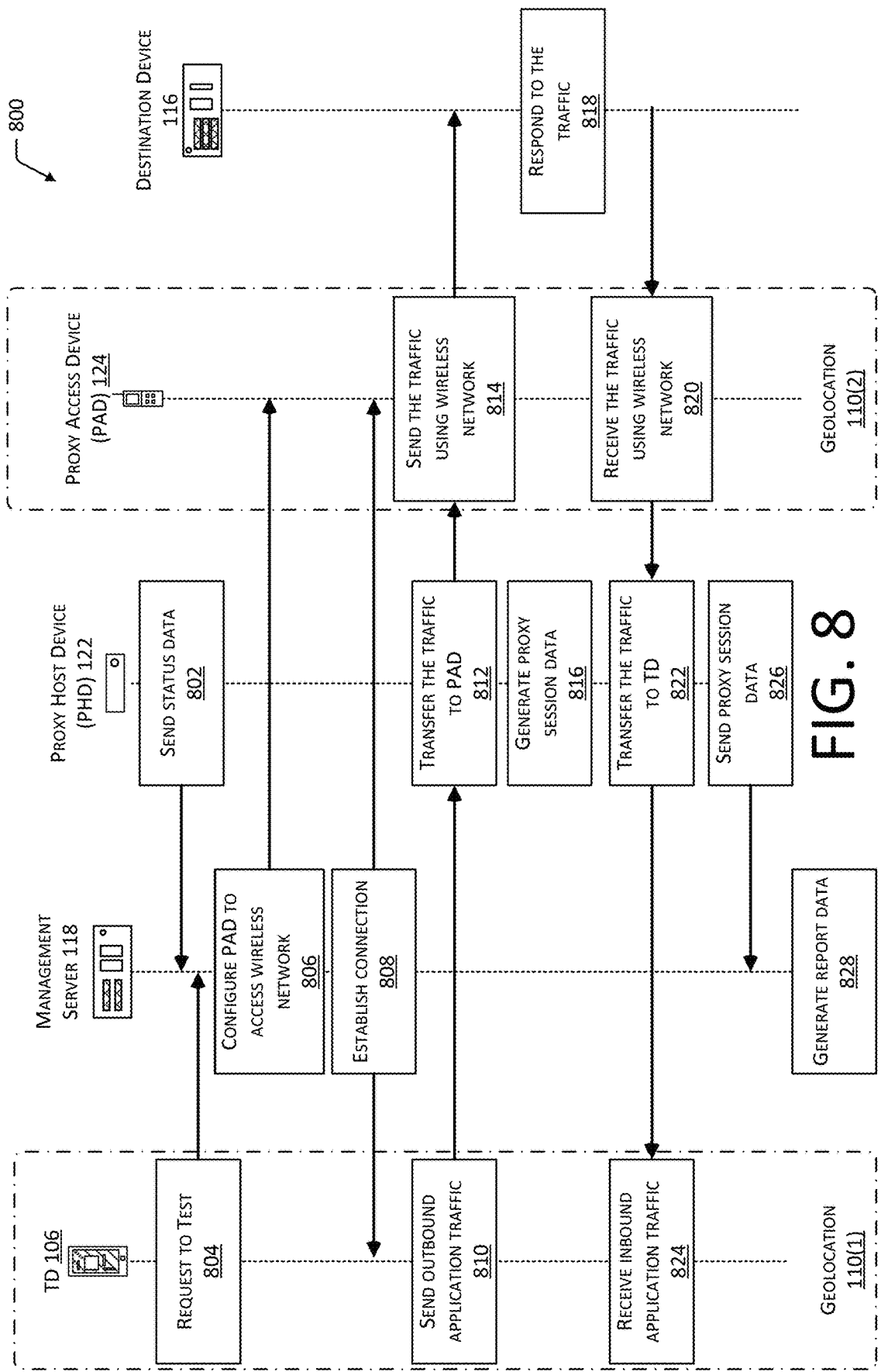
FIG. 8 is a flow diagram of a process for directing traffic from an application under test executing on a test device through a proxy access device and out to a network at another geolocation, according to one implementation.

FIG. 8 is a flow diagram of a process 800 for directing traffic from an AUT 104 executing on a TD 106 through a proxy access device 124 and out to a second network 112(2) at the second geolocation 110(2), according to one implementation.

In this illustration, the TD 106, the management server 118, the proxy host device 122, the proxy access device 124, and the destination device 116 are depicted. In some implementations, one or more of the functions described below may be performed by different devices or combination of devices. The TD 106 is physically located at a first geolocation 110(1). For example, the TD 106 may be at the developer's 102 office in Sacramento, Calif. The proxy access device 124 is physically located at a second geolocation 110(2). For example, the cell phone that is being used as a proxy access device 124 may be located in São Paulo, Brazil.

At 802, the status data 536 is sent from the proxy host device 122 to the management server 118. For example, the status data 536 may indicate that a particular proxy access device 124 is available, the network 112 that is connected thereto, and so forth.

At 804, the TD 106 sends a request to test to the management server 118. For example, the developer 102 may have used the user interface to select São Paulo, Brazil for testing, and the SDK 212 may generate and send the request.

At 806, the proxy access device 124 is configured to access the second network 112(2). For example, the management server 118 may send device configuration data 544 to the proxy host device 122. The proxy host device 122 may then use the device configuration data 544 to prepare the proxy access device 124 for data transfer.

At 808, a connection is established between the AUT 104 and the proxy access device 124. For example, the management server 118 may send to the TD 106 the test configuration data 436 that is indicative of the network address and connection credentials for the proxy host device 122. The TD 106 may then establish a transmission control protocol (TCP) connection with the proxy access device 124.

In some implementations, the connection may comprise a virtual private network (VPN) between the TD 106 and the proxy access device 124. For example, the TD 106 and the proxy access device 124 may establish digital certificates or other cryptographic credentials to authenticate one another and establish an encrypted connection or "tunnel", which may include an intermediary module 144. In some implementations, the traffic sent using the VPN may be unencrypted. For example, the VPN may use unencrypted generic routing encapsulation (GRE) to provide for tunneling between the TD 106 and the proxy access device 124. In other implementations, the traffic sent using the VPN connection may be encrypted. In either case, unless a host-port pair associated with the VPN connection is in the list of host-port pairs, the intermediary module 144 may capture VPN data 148 from the VPN connection. If the intermediary module 144 detects an error, the intermediary module 144 may stop capturing the VPN data 148 and may update a set of network rules including a list of host-port pairs. Other implementations are also possible.

At 810, the TD 106 sends outbound application traffic 128 to the proxy host device 122. For example, the SDK 212 may intercept the outbound application traffic 128 and redirect it to the proxy access device 124 by way of the established connection. During testing, the TD 106 may still maintain otherwise normal access to the network 112. For example, the developer 102 may be able to use other applications or modules to access resources on the Internet using the first network 112(1) without hindrance.

The AUT 104 and elements of the SDK 212 may be configured to execute using the typical OS privileges associated with a user. For example, the AUT 104 may execute in the user space, as compared to a kernel space, of the OS module 422. The user space may be associated with fewer privileges within the OS compared to a root account, superuser, administrator, or other types of elevated accounts.

At 812, the proxy host device 122 transfers the outbound application traffic 128 to the proxy access device 124. For example, the outbound application traffic 128 is passed to the proxy access device 124 using the USB I/O interface 710 of the proxy access device 124.

At 814, the proxy access device 124 sends the outbound application traffic 128 to the destination device 116 by way of the second network 112(2). Continuing the example, the outbound application traffic 128 is sent to the destination device 116 using the network interface 712.

At 816, the proxy host device 122 generates the proxy session data 134. For example, the proxy host device 122 may acquire packet capture of the data transfer, or information associated with the data transfer. By collecting the proxy session data 134 at the proxy host device 122, the effects associated with the connection between the TD 106 and the proxy host device 122 may be removed from consideration. Instead, the proxy session data 134 may provide information such as latency as measured from the proxy host device 122 or the proxy access device 124 with respect to the destination device 116.

During testing, the developer 102 may experience the additional latency associated with the communication between the TD 106 and the proxy host device 122. However, this additional latency will not be reflected in the proxy session data 134.

At 818, the destination device 116 responds to the traffic. For example, where the outbound application traffic 128 comprises a request for information, the response may be for the destination device 116 to provide the requested information. The destination device 116 sends inbound application traffic 130, such as the response to the proxy access device 124, again by way of the second network 112(2).

At 820, the proxy access device 124 receives the inbound application traffic 130. The inbound application traffic 130 is passed to the proxy host device 122 using the USB I/O interface 710.

At 822, the proxy host device 122 transfers the inbound application traffic 130 to the TD 106. For example, the inbound application traffic 130 may be transferred using the first network 112(1).

At 824, the TD 106 receives the inbound application traffic 130. The SDK 212 may pass the inbound application traffic 130 to the rest of the AUT 104. The AUT 104 then processes the inbound application traffic 130 as it otherwise normally would.

At 826, the proxy session data 134 is sent from the proxy host device 122 to the management server 118. In other implementations, an aggregation server or other device may be used to acquire the proxy session data 134, which may then be accessed by the management server 118.

At 828, the management server 118 generates the report data 142 based at least in part on the proxy session data 134. For example, the report data 142 may include VPN data 148 and information about the VPN session as well as other data.

The developer 102 may then access the report data 142. For example, the report data 142 may be sent to the TD 106, the workstation 108, or another device. By using the techniques described, information about the AUT 104 may be obtained under real-world conditions and real-world usage. In particular, information may be obtained about the operation of the AUT 104 under the network conditions at different geolocations 110. The developer 102 may use this information to improve the overall quality of subsequent versions of the AUT 104.

Figure 9:
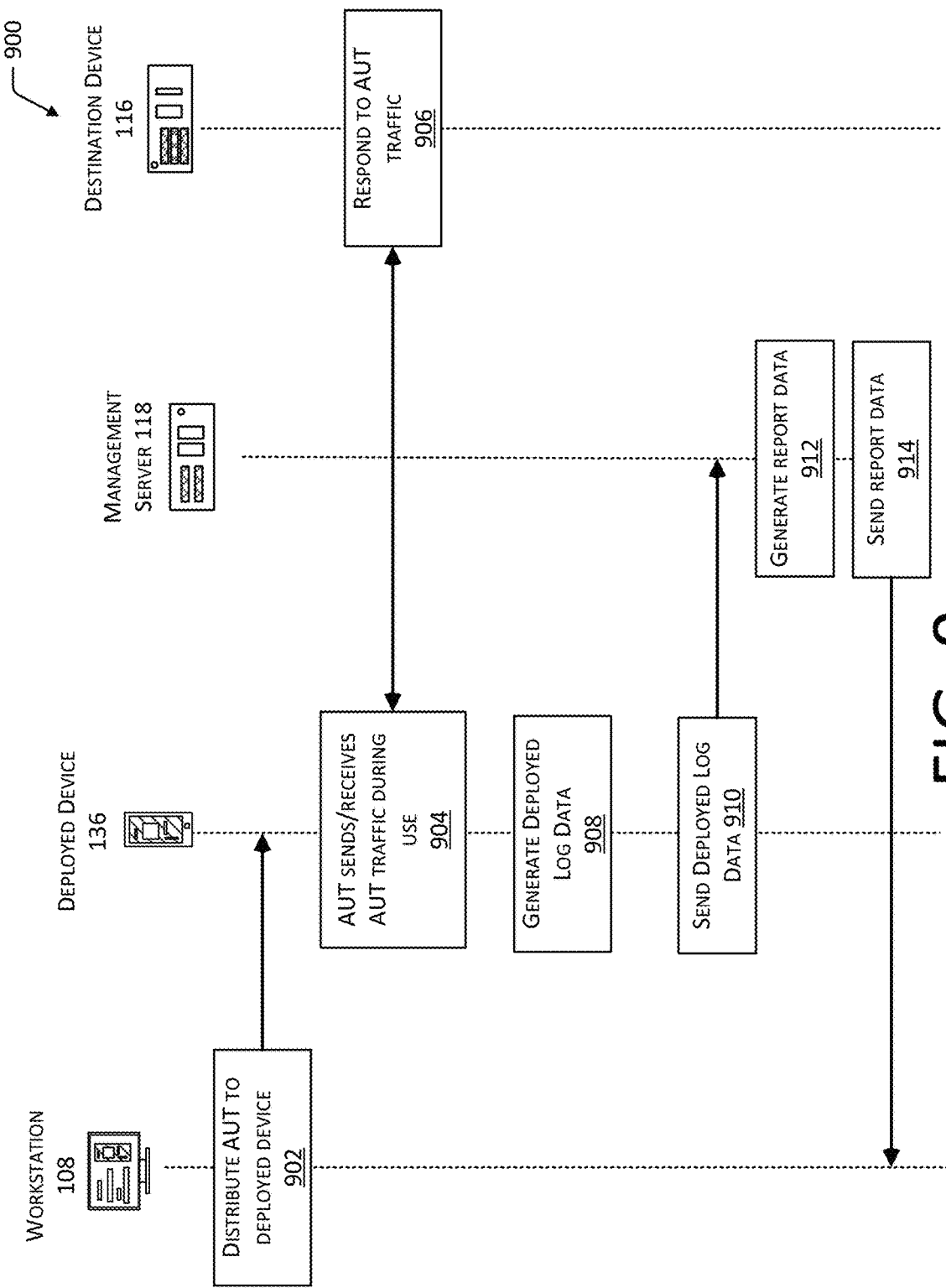
FIG. 9 is a flow diagram of a process for obtaining deployed log data from deployed devices executing the application under test, according to one implementation.

FIG. 9 is a flow diagram of a process 900 for obtaining deployed log data 138 from deployed devices 136 executing the AUT 104, according to one implementation. In this illustration, the workstation 108, the deployed device 136, the management server 118, and the destination device 116 are depicted. In some implementations, one or more of the functions described below may be performed by different devices or combination of devices.

At 902, the AUT 104 is distributed to one or more deployed devices 136. In some implementations, the AUT 104 may also be distributed to one or more proxy access devices 124. For example, the developer 102 may send the AUT 104 to an application distribution server. Users of the deployed devices 136 may then retrieve the AUT 104 from the application distribution server for installation and subsequent use. The AUT 104 may incorporate one or more elements of the SDK 212. In particular, these elements of the SDK 212 may be configured to generate the deployed log data 138 and provide the deployed log data 138 to the management server 118. Further, in some implementations, the SDK 212 or the AUT 104 may include an intermediary module 144 that may form part of a VPN connection.

At 904, the AUT 104 at the deployed device 136 sends or receives AUT traffic 114 to the destination device 116 during use of the AUT 104. In some implementations, the AUT traffic 114 may be sent through a VPN connection that includes the intermediary module 144.

At 906, the destination device 116 responds to the AUT traffic 114. In some implementations, the destination device 116 may send inbound application traffic 130 to the AUT 104 without prior request. For example, the destination device 116 may "push" data to the AUT 104 without earlier communication.

At 908, deployed log data 138 is generated. For example, the SDK 212 may interrogate the network interface 414 of the deployed device 136 to determine information about the connection to the wireless network 112, may access information indicative of geolocation 110, such as coordinates provided by the positioning device, and so forth. Further the SDK 212 or the intermediary module 144 may collect the VPN data 148.

At 910, the deployed log data 138 is sent to the management server 118. The VPN data 148 may be provided to the management server 118. In some implementations, the deployed log data 138 may be streamed in real time or near real time to the management server 118. For example, the deployed log data 138 may be sent every five seconds to the management server 118. Similarly, the VPN data 148 may be sent to the management server 118 in real time or near real time or may be sent periodically.

At 912, the management server 118 generates the report data 142. For example, as described above, the analysis module 140 may process the log data 132 and the VPN data 148 and may generate the report data 142. In some implementations, the report data 142 may comprise a graphical representation, which may be rendered on a computing device 402, such as within an Internet browser application or other application or module.

At 914, the management server 118 sends the report data 142 to the workstation 108. For example, the developer 102 may use the user interface provided by the developer interface module 524 to retrieve the report data 142 for a particular interval of time, geolocation 110, and so forth. The developer 102 may then use the report data 142 to make changes to the AUT 104. By using the techniques described, information about the AUT 104 may be obtained under real-world conditions and real-world usage, resulting in improvements in overall quality of subsequent versions of AUT 104.

Figure 10:
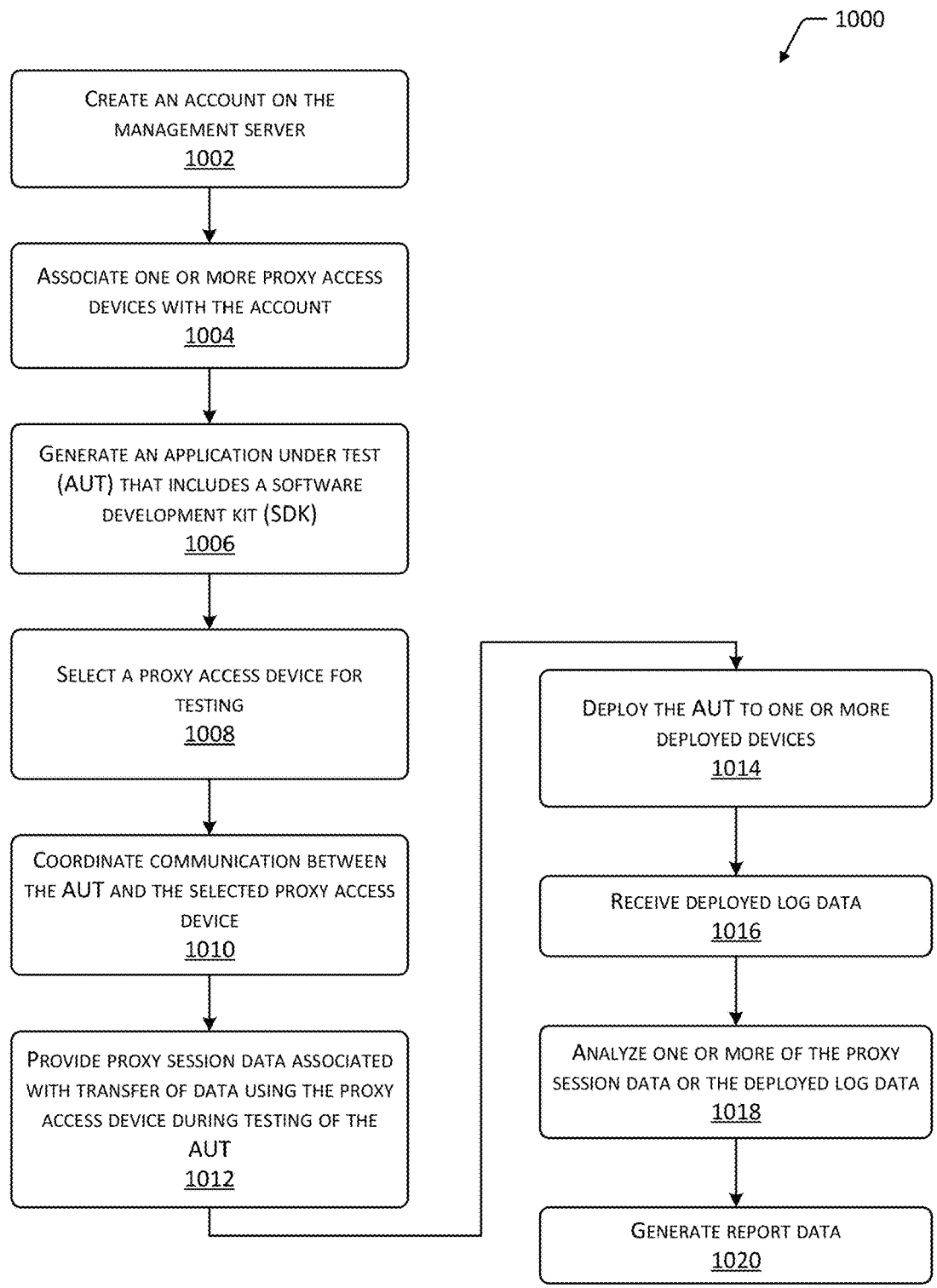
FIG. 10 is a flow diagram of a process for generating report data associated with an application under test, according to one implementation.

FIG. 10 is a flow diagram of a process 1000 for generating report data 142 associated with an AUT 104, according to one implementation. One or more of the functions described below with regard to the process 1000 may be performed at least in part by one or more of the TD 106, the management server 118, the proxy host device 122, or the proxy access device 124.

In some implementations, one or more of the functions described below may be performed by different devices or combination of devices.

At 1002, an account may be created on the management server 118. For example, the developer 102 may use a user interface to set up an account, specify payment information, set preferences with regard to encryption of AUT traffic 114 or report data 142, and so forth.

At 1004, one or more proxy access devices 124 may be associated with the account. For example, the developer 102 may have a colleague set up the proxy host device 122 and the tethered proxy access device 124 at a second geolocation 110(2). In another example, the developer 102 may purchase access to proxy host devices 122 and proxy access devices 124 that are maintained by another entity.

At 1006, the AUT 104 is generated that includes the SDK 212. For example, the SDK 212 or portions thereof may be incorporated into the AUT 104 at compile time.

At 1008, the proxy access device 124 is selected for testing. For example, the user interface may be used by the developer 102 to select the proxy access device 124 at a particular geolocation 110.

At 1010, communication between the AUT 104 and the selected proxy access device 124 is coordinated. For example, the management server 118 may send test configuration data 436 to the AUT 104. The AUT 104 may use the network address and credentials in the test configuration data 436 to establish the first connection with the proxy host device 122 that is in communication with the proxy access device 124.

At 1012, the proxy session data 134 associated with transfer of data during testing of the AUT 104 using the proxy access device 124 is provided. For example, the proxy session data 134 may be provided to the management module 120. The proxy session data 134 may be obtained by the proxy host device 122 as described above. In some implementations, the proxy session data 134 may include VPN data 148 captured using an intermediary module 144.

At 1014, the AUT 104 may be deployed to one or more deployed devices 136. For example, the AUT 104 may be distributed to the deployed devices 136 by way of an application distribution server.

At 1016, the deployed log data 138 is received. For example, the management module 120 of the management server 118 may receive the deployed log data 138 that is being streamed from the deployed devices 136 while the AUT 104 is in use.

At 1018, one or more of the log data 132 or other information may be analyzed. For example, the proxy session data 134 and the deployed log data 138 may be analyzed to determine particular networks 112 on which communication to the destination device 116 exhibit performance below a threshold value.

At 1020, report data 142 may be generated. For example, the report data 142 may comprise a graphical representation or tabular data. The report data 142 may be accessed by the developer 102, such as by using an Internet browser executing on the workstation 108 or the TD 106.

Figure 11:
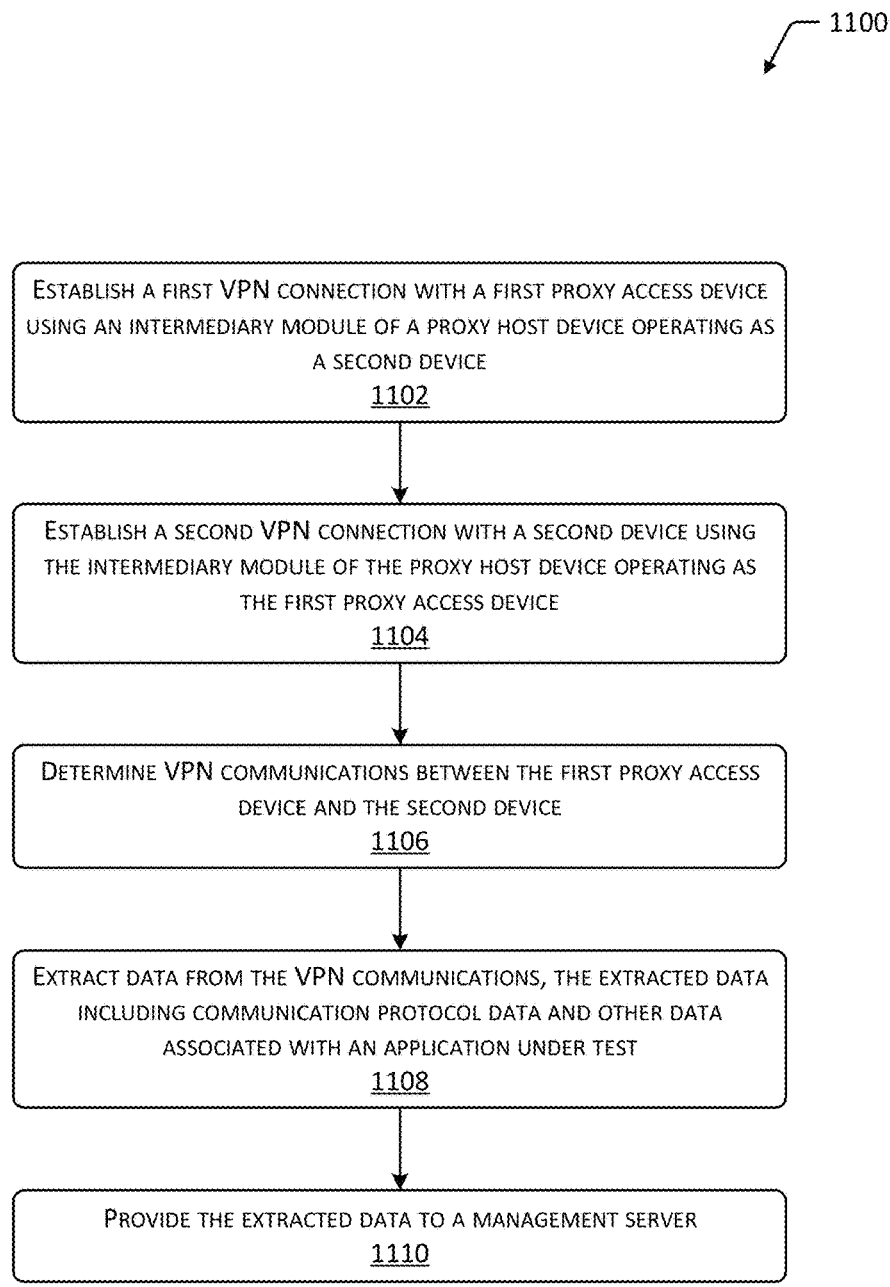
FIG. 11 depicts a flow diagram of a process of determining data from a virtual private network (VPN) connection and providing the data to a management server, according to one implementation.

FIG. 11 depicts a flow diagram 1100 of a process of determining data from a VPN connection and providing the data to a management server 118, according to one implementation. The data may be determined using an intermediary module 144 that is part of the VPN connection. In one possible example, the VPN connection may include a first portion between a first proxy access device 124(1) and the intermediary module 144 and a second portion between the intermediary module 144 and a second proxy access device 124(2). Other implementations are also possible.

At 1102, a first VPN connection is established with a first proxy access device 124(1) using an intermediary module 144 of a proxy host device 122 operating as a second device. For example, the first proxy access device 124(1) may send a VPN request to a second device, such as a second proxy access device 124(2), a TD 106, a destination device 116, or another device through one or more networks 112. In one possible implementation, the intermediary module 144 may receive a VPN request from the first proxy access device 124(1).

At 1104, a second VPN connection is established with a second device using the intermediary module 144 of the proxy host device 122 operating as the first proxy access device 124(1). The second device may include a TD 106, a destination device 116, a second proxy access device 124(2), or another device. For example, the second VPN connection may be established between the intermediary module 144 and the second proxy access device 124(2). Continuing the example, the first VPN connection and the second VPN connection form a VPN tunnel between the first proxy access device 124(1) and the second proxy access device 124(2). The intermediary module 144 may communicate with the second device to retrieve a certificate from the second device. The intermediary module 144 may sign the certificate with its own public key and may create a spoof certificate for the first proxy access device 124(1). In this way, the intermediary module 144 may place itself within the VPN connection.

At 1106, VPN communications between the first proxy access device 124(1) and the second device are determined. At this point, either the first proxy access device 124(1) begins sending data indicating that the first proxy access device 124(1) trusts the VPN connection, or the first proxy access device 124(1) terminates the connection, indicating that the VPN connection is not trusted. For example, the intermediary module 144 may capture VPN data as well as session data and information about the VPN tunnel. In one possible example, the intermediary module 144 may determine VPN protocols, information within the VPN connection, other data or any combination thereof. Because the intermediary module 144 is part of the VPN connection, the intermediary module 144 may access the data within the VPN tunnel to capture VPN data 148.

At 1108, the data may be extracted from the VPN communications, where the extracted data includes communication protocol data and other data associated with an AUT 104. For example, the data may include AUT data that is part of the AUT traffic 114 as well as session data. Further, the data may include VPN communication protocol data, encryption data, VPN tunnel data, other data, or any combination thereof.

At 1110, the extracted data may be provided to a management server 118. The extracted data may include VPN data 148, extracted application data 150, AUT traffic 114, timestamp data, other data, or any combination thereof. The extracted data may be stored in the proxy session data 134 of the log data 132. The proxy session data 134 can include VPN data 156, aggregated AUT data 158, and exception data 160. For example, the intermediary module 144 may capture the VPN data 148 and forward the VPN data 148 and associated information to the management server 118. In some implementations, the intermediary module 144 may selectively unwrap the transport layer security (TLS) session data to determine the communication protocols, which can be communicated to the management server 118 to allow an analysis module 140 to perform a deeper protocol analysis of traffic. Other implementations are also possible.

It should be understood that the first proxy access device 124(1) and the second device may monitor the VPN connection to detect errors, which may indicate that the VPN tunnel has been compromised. The intermediary module 144 may be configured to determine errors, which may be indicative of detection of the intermediary module 144. In response to determining such an error, the intermediary module 144 may stop capturing the VPN data 148 and may determine the host name and port number of the VPN session. The host name and port number may be stored in a list of host-port pairs. Subsequently, the intermediary module 144 may decide whether to capture the VPN data 148 based on a correspondence between the host name and port number of the VPN request and the list of host-port pairs. For example, if the host name and port number are in the list of host-port pairs, the intermediary module 144 may decide not to capture the VPN data 148. If the host name and port number are not in the list of host-port pairs, the intermediary module 144 may capture the VPN data 148.

Figure 12:
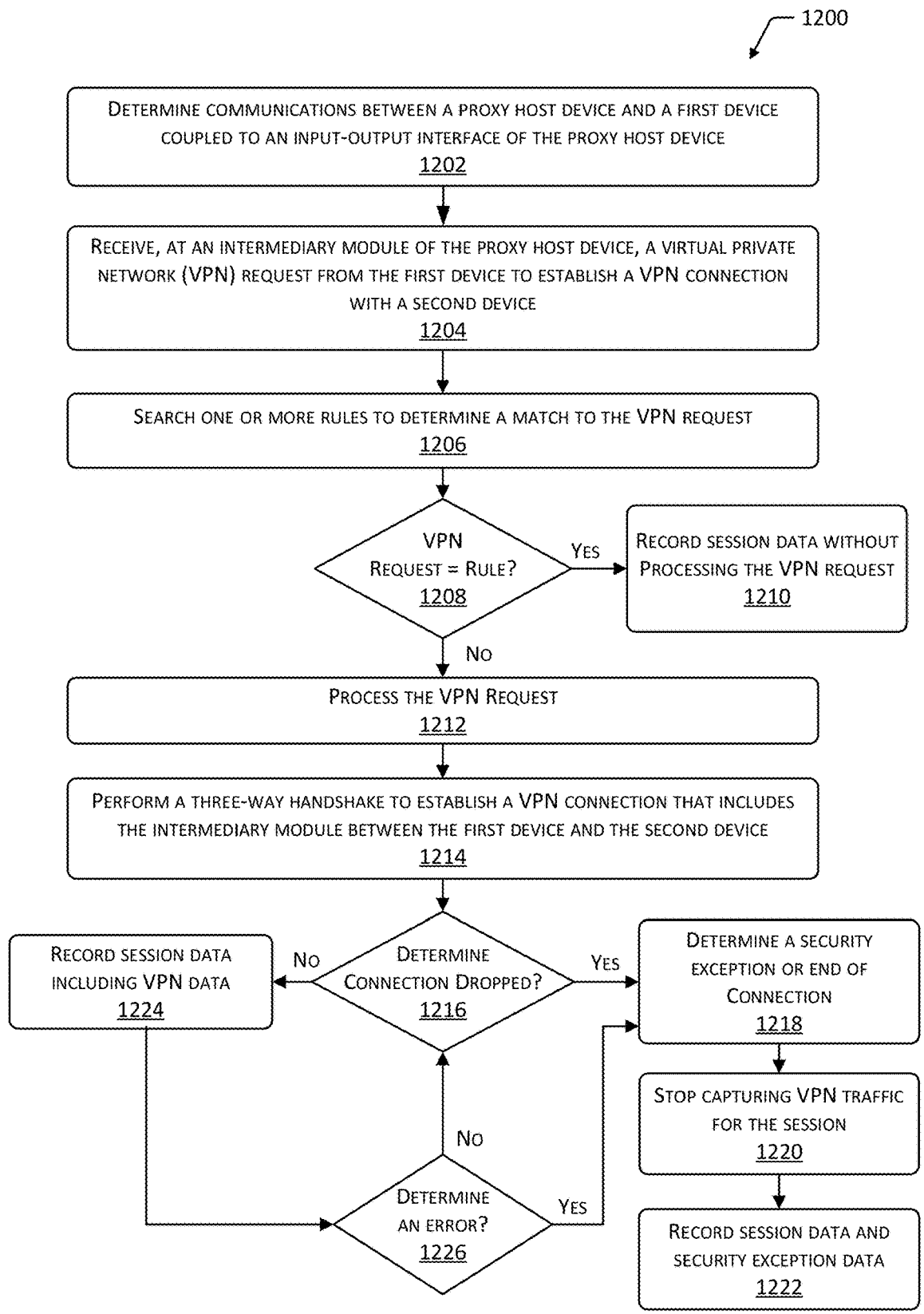
FIG. 12 depicts a flow diagram of a process of determining an error indicative of detection of the intermediary module, according to one implementation.

FIG. 12 depicts a flow diagram 1200 of a process of determining an error indicative of detection of the intermediary module 144, according to one implementation. The intermediary module 144 may first decide whether to capture the VPN data 148. Once the intermediary module 144 is actively capturing the VPN data 148, if an error is detected that may be indicative of or suggestive of detection of the intermediary module 144 within the VPN connection, the intermediary module 144 may stop capturing the VPN data 148 and may store the host-port pair in the list of host-port pairs to avoid being detected by that particular host-port pair in the future.

At 1202, communications are determined between a proxy host device 122 and a first device coupled to an I/O interface 610 of the proxy host device 122. The first device may be an embodiment of a proxy access device 124. In some implementations, the proxy host device 122 may detect the proxy access device 124 coupled to its I/O interface 610.

At 1204, a VPN request may be received from the first device at an intermediary module 144 of the proxy host device 122 to establish a VPN connection with a second device. For example, an AUT 104 executing on a proxy access device 124 may initiate a VPN request to a second device. The proxy host device 122 may receive the VPN request.

At 1206, one or more rules may be searched to determine a match to the VPN request. For example, the VPN request may include a host name and a port number. The one or more rules may include a list of host-port pairs, and the intermediary module 144 may search the one or more rules to determine a match. The list of host-port pairs may include host names and port numbers added by a developer. In some implementations, the list of host-port pairs may include host names and port numbers added by the intermediary module 144 in response to detecting an error in the VPN data 148, the VPN connection, or both. The error may be indicative of detection of the intermediary module 144.

At 1208, if the data from the VPN request matches a host-port pair of the one or more rules, the session data may be recorded without processing the VPN request, at 1210. For example, the VPN connection may be established without the intermediary module 144 being part of the VPN connection. For example, the intermediary module 144 determines whether to capture the VPN data based on the one or more rules. The one or more rules may be based on configuration rules and a history of what works, what doesn't work, what is important, and what isn't important.

At 1208, if the host name and port number of the VPN request is not equal to the one or more rules, the intermediary module 144 may process the VPN request, at 1212. For example, if the host name is not included in the list of host names and port numbers, the intermediary module 144 may proceed with capturing the VPN data 148.

At 1214, a three-way handshake is performed to establish a VPN connection that includes the intermediary module 144 between the first device and the second device. The three-way handshake may be performed by the intermediary module 144. The intermediary module 144 may receive the VPN request from the first device. In response to the VPN request, the intermediary module 144 may communicate with the second device to acquire a certificate. The intermediary module 144 may verify and sign the certificate with its own public key to create a "spoof" certificate for the first device. Thus, the intermediary module 144 may establish a first portion of a VPN connection between the first device and the intermediary module 144 and a second portion of the VPN connection between the intermediary module 144 and the second device.

At 1216, the intermediary module 144 may determine that the connection was dropped. If the connection is dropped, the intermediary module 144 may determine a security exception or end of a connection, at 1218. For example, if one of the first device or the second device terminates the connection before completion of a data transfer operation, the security exception or the end of the connection may be indicative of detection of the intermediary module 144.

At 1220, the intermediary module 144 may stop capturing VPN traffic for the session. For example, the intermediary module 144 may be part of the VPN connection. The intermediary module 144 may allow the VPN data 148 to be transferred between the first device and the second device without intercepting or otherwise capturing the VPN data 148.

At 1222, the intermediary module 144 may record session data and security exception data in a data store 306. For example, the intermediary module 144 may store the received session data without extracting the VPN data 148. The security exception data may include a marker or tag indicative of possible detection of the intermediary module 144. In one possible example, the marker or tag may indicate that the intermediary module 144 "should have intercepted the AUT traffic 114 from the VPN connection but didn't because an error was detected that might have affected the operation of the device."

Returning to 1216, if the VPN connection is not dropped, the intermediary module 144 may record the session data including the VPN data 148 at 1224. In some examples, the intermediary module 144 may record the AUT traffic 114 including the VPN data 148.

At 1226, if the intermediary module 144 does not determine an error, the method returns to 1216 to determine if the connection was dropped. Otherwise, if the intermediary module 114 determines an error at 1226, the method returns to 1218 to determine a security exception or an end of the connection.

It should be understood that the intermediary module 144 may be configured to capture VPN data 148, such as data packets, from a proxy access device 124 or another device. In some implementations, the proxy access device 124 may be a smartphone device or other computing device. For example, the proxy access device 124 may be a computing device that has an iOS operating system by Apple Computer of Cupertino, Calif. In another example, the proxy access device 124 may be a computing device that has an Android operating system by Google, Inc. of Mountain View, Calif. The computing device may be an off-the-shelf, commercially available computing device that has not been modified to bypass integrated security protections. Bypassing such security protections is commonly referred to as "Jailbreaking". However, the intermediary module 144 is configured to capture VPN data 148 and AUT traffic 114 without bypassing the built-in security protections, allowing for testing of the proxy access device 124 and of the AUT 104 without having to compromise the device's security features.

In the example of FIG. 12, errors may be detected that may prevent the system from completing a test of the application or device because the VPN connection may be lost or because detection of the presence of the intermediary module 144 may have caused one or both devices to change their operation in some way. In the following example of FIG. 13, a method of iterative deepening is described in which detected errors cause the intermediary module 144 to store a host name and port number in a list, so that the intermediary module 144 may determine not to intercept or capture VPN data 148 involving that host-port pair in the future. By avoiding interception of VPN data 148 for the host-port pair that previously produced an error, a testing process may be repeated for a particular device and the next text may advance further than the previous test without detection of an error. In the following example, the intermediary module 144 may store the host name and port number in the list of host-port pairs with each iteration until an entire test process is completed without encountering an error, such as a TLS exception.

Figure 13:
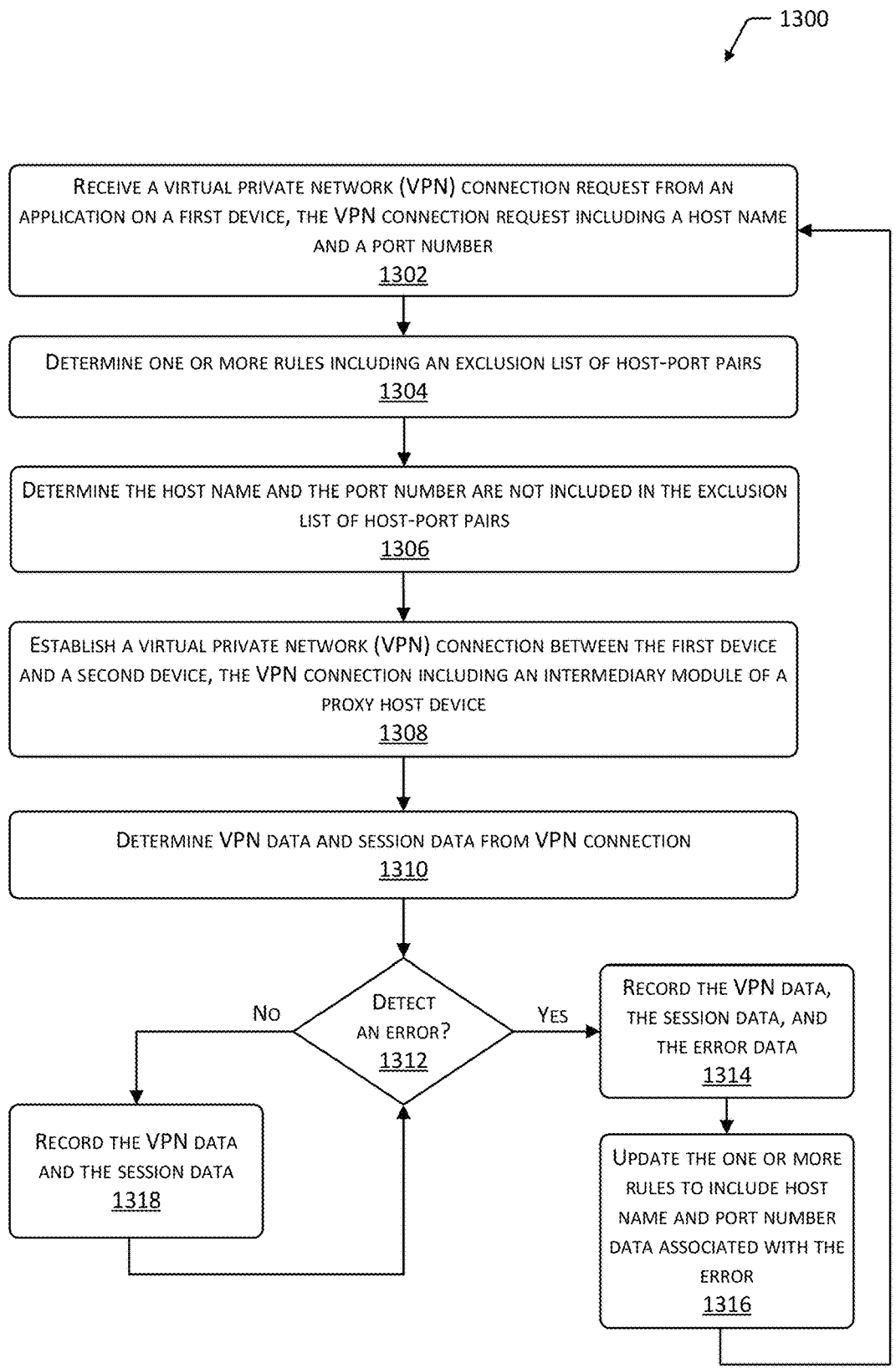
FIG. 13 depicts a flow diagram of a process of iterative deepening for testing virtual private network (VPN) data from an application on a device under test, according to one possible implementation.

FIG. 13 depicts a flow diagram 1300 of a process of iterative deepening for testing virtual private network (VPN) data 148 from an application on a device under test, according to one possible implementation. The device under test may be a proxy access device 124, which may be a portable computing device, such as a smartphone.

At 1302, a VPN connection request is received from an application on a first device. The VPN connection request may include a host name and a port number. The VPN connection request may be received at a proxy host device 122.

At 1304, an intermediary module 144 may determine one or more rules including an exclusion list of host-port pairs. For example, the list of host-port pairs may include host names and port numbers that have been excluded from capture of VPN data 148 by a developer storing such host names and port numbers in the list. In another example, the intermediary module 144 may have stored the host names and port numbers in the list in response to previously detected errors in the VPN data 148 or the VPN connection.

At 1306, the intermediary module 144 determines that the host name and port number of the VPN connection request are not included in the exclusion list of host-port pairs. For example, if the host name and port number were included in the exclusion list, the intermediary module 144 may allow the VPN connection request to proceed without becoming involved in the VPN connection. In this case, the host name and port number are not in the list.

At 1308, the intermediary module 144 may establish a VPN connection between the first device and the second device, where the VPN connection includes the intermediary module 144 of the proxy host device 122. For example, the intermediary module 144 may establish a first portion of a VPN connection between the intermediary module 144 and the first device and a second portion of a VPN connection between the intermediary module 144 and the second device. Thus, the intermediary module 144 may be part of a VPN connection between the first and second devices.

At 1310, the intermediary module 144 may determine VPN data 148 and session data from the VPN connection. In an example, the intermediary module 144 may capture packets sent from or received by the first device through the VPN connection. The intermediary module 144 may unwrap the transport layer security (TLS) sessions to inspect the VPN protocols and to extract the VPN data 148, which may include the transmitted application data, protocol data, other session information, or any combination thereof. The VPN data 148 may be provided to a management server 118 to enable analysis of the VPN data 148.

At 1312, if an error is detected in the VPN data 148 or the VPN connection, the method may include recording the VPN data 148, the session data, and the error data, at 1314. For example, the VPN data 148 may be recorded in a data store 306 together with a marker indicating that the intermediary module 144 should probably have captured the data, but that the error indicated that one or both devices may have detected the presence of the intermediary module 144.

At 1316, the one or more rules may be updated to the include the host name and port number data associated with the error. For example, the intermediary module 144 may store the host name and port number in a list of host-port pairs.

The method may then return to 1302 to receive a VPN connection request. For example, the proxy host device 122 may send a control signal to the proxy access device 124 to trigger the proxy access device 124 to initiate a VPN connection request. Other implementations are also possible.

Returning to 1312, if no error is detected, the method may include recording the VPN data and the session data at 1318. The method may then return to 1312 to determine if an error is detected. For example, the intermediary module 144 may capture the VPN data 148 and may continue to monitor for detection of the intermediary module 144 by one or both of the devices. Other implementations are also possible.

Figure 14:
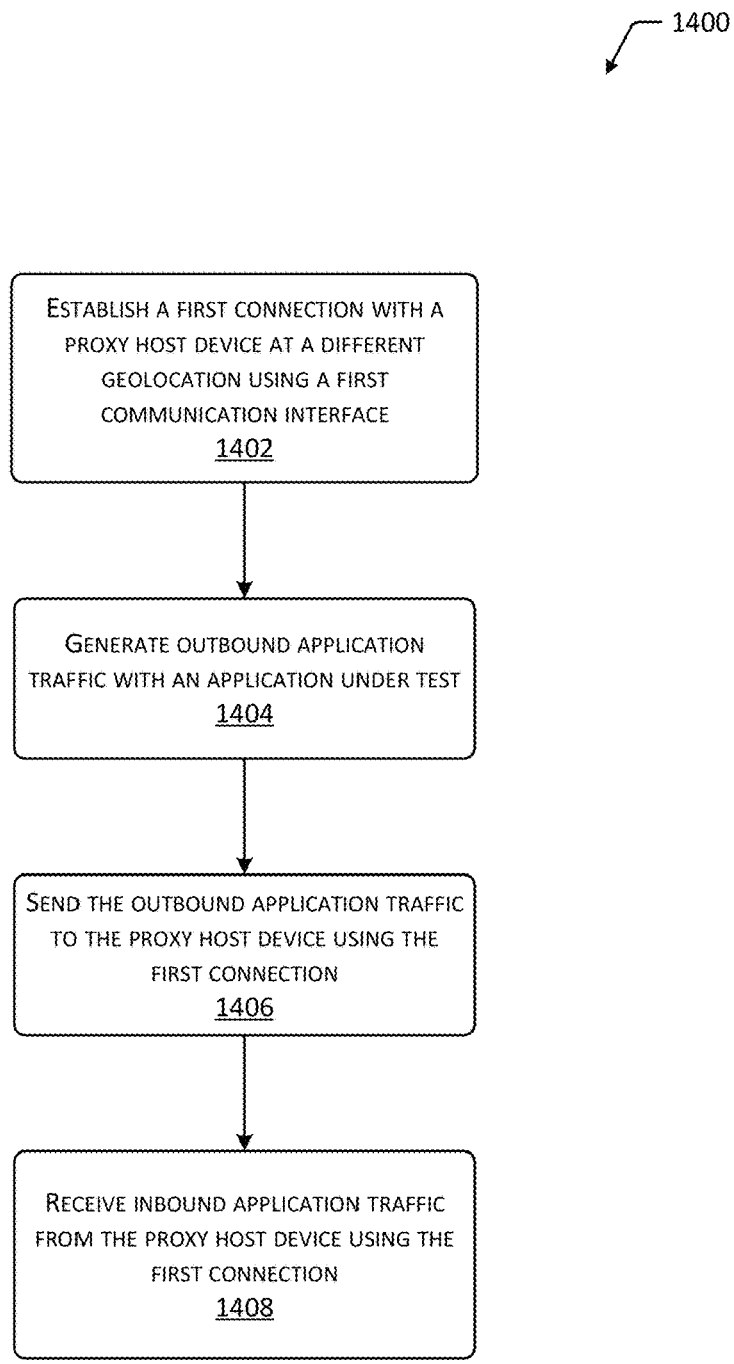
FIG. 14 is a flow diagram of a process for operating a test device during testing of an application under test, according to one implementation.

FIG. 14 is a flow diagram of a process 1400 for operating a TD 106 during testing of an AUT 104, according to one implementation. The TD 106 may include an SDK 212 and optionally an intermediary module 144, which may be configured to capture VPN data 148.

At 1402, the TD 106 establishes a first connection with a proxy host device 122 using a first communication interface. The TD 106 may be at a first geolocation 110(1) while the proxy host device 122 is at a second geolocation 110(2). For example, the developer 102 using the TD 106 may be in Chicago, Ill., USA, while the proxy host device 122 is in Toronto, Ontario, Canada. In some implementations, the first connection may be a VPN connection that includes an intermediary module 144, which may be within the proxy host device 122, within the SDK 212 of the TD 106, or both.

At 1404, outbound application traffic 128 is generated by the AUT 104. For example, the AUT 104 may make a request for information to the destination device 116.

At 1406, the outbound application traffic 128 is sent to the proxy host device 122 using the first connection. For example, one or more instructions in the SDK 212 may direct the outbound application traffic 128 to a particular Internet Protocol (IP) address and port of the proxy host device 122. The proxy host device 122 may in turn pass the outbound application traffic 128 to the proxy access device 124 that is tethered to the proxy host device 122. In some implementations, the outbound traffic 128 may be sent to the proxy host device 122 through the first connection, which may be a VPN connection.

In some implementations, the intermediary module 144 of the proxy host device 122 may receive the outbound application traffic 128 and may unwrap the transport layer security (TLS) to extract the VPN data 148 and to inspect the VPN protocols. The extracted VPN data 148 may be sent by the intermediary module 144 to the management server 118.

At 1408, the inbound application traffic 130 is received from the proxy host device 122 using the first connection. For example, the proxy host device 122 may receive the inbound application traffic 130 from the proxy access device 124 using the first connection to the TD 106. Depending on the implementation, the intermediary module 144 may be part of the proxy host device 122 and may capture the VPN data 148 before forwarding the data to the proxy access device 124. Alternatively, the intermediary module 144 may be included within the proxy access device 124 and may capture the VPN data 148 before providing the inbound application traffic 130 to the proxy host device 122. Other implementations are also possible.

Figure 15:
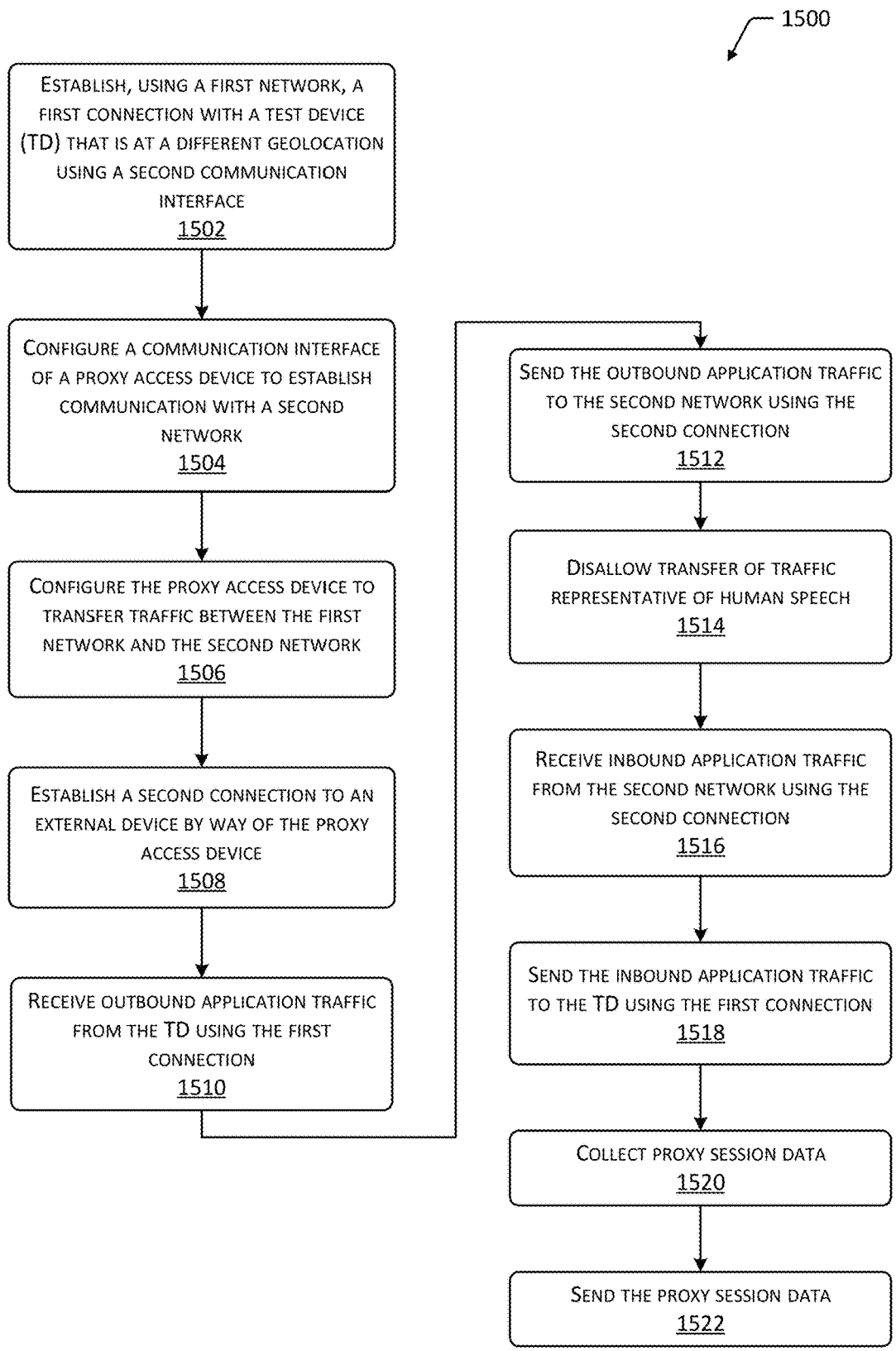
FIG. 15 is a flow diagram of a process for operating a proxy host device, according to one implementation.

FIG. 15 is a flow diagram of a process 1500 for operating a proxy host device 122, according to one implementation.

At 1502, the proxy host device 122 establishes a first connection with the TD 106 using the first network 112(1). For example, the proxy host device 122 may receive a connection request from the TD 106 and may respond to the connection request to open the first connection. The intermediary module 144 of the proxy host device 122 may establish a VPN connection between the TD 106 and the intermediary module 144. The TD 106 may be at a first geolocation 110(1) while the proxy host device 122 is at a second geolocation 110(2). In some implementations the first connection may be implemented as a VPN connection.

At 1504, a communication interface 208 of the proxy access device 124 that is connected to the proxy host device 122 may be configured to establish communication with the second network 112(2). For example, the proxy host device 122 may provide instructions to the proxy access device 124 that, when processed by the proxy access device 124, establishes a communication session with the network access point 126 and the corresponding second network 112(2) that is accessed thereby.

At 1506, the proxy access device 124 is configured to transfer traffic between the first network 112(1) and the second network 112(2). For example, the proxy access device 124 may be sent instructions that install and execute the local traffic module 726. In some implementations, the traffic may be transferred through a VPN connection that includes the intermediary module 144.

At 1508, a second connection to an external device such as the destination device 116 is established by way of the proxy access device 124. For example, the second connection may comprise a VPN connection between the intermediary module 144 of the proxy access device 124 and the destination device 116. In some implementations, the second connection may be between the intermediary module 144 of the proxy host device 122 and the destination device 116 or may be between the proxy access device 124 and the destination device 116.

At 1510, outbound application traffic 128 is received from the TD 106 using the first connection. For example, the outbound application traffic 128 may be received across one of the network interfaces 612 of the proxy host device 122. The intermediary module 144 may capture VPN data 148 from the outbound application traffic 128.

At 1512, the outbound application traffic 128 is sent to the second network 112(2) using the second connection. For example, the traffic proxy module 626 may receive the outbound application traffic 128 from the TD 106 and forward the outbound application traffic 128 to the proxy access device 124 by way of the I/O interfaces 610. In some implementations, a second intermediary module 144(2) may capture VPN data 148(2) at the proxy access device 124.

In some implementations, it may be advantageous to prevent the transfer of traffic representative of human speech between the TD 106 and the proxy access device 124. For example, the administrator of the management server 118 may wish to prevent developers 102 from placing telephone calls at the second geolocation 110(2).

At 1514, transfer of traffic representative of human speech may be disallowed. For example, packets that contain header information indicative of voice traffic may be blocked. In another example, IP ports associated with the transfer of voice data may be blocked.

In some implementations, a billing account associated with service provisioned to the proxy access device 124 may allow data traffic on the second network but disallow voice traffic. For example, a billing account for the cellphone used as a proxy access device 124 may pay for, and be provisioned only for, data and not voice traffic. Other types of traffic may be disallowed, or not paid for. For example, short message service (SMS) services may not be provisioned for in the billing account of the proxy access device 124.

At 1516, inbound application traffic 130 is received by the proxy host device 122 from the second network 112(2) using the second connection. For example, the inbound application traffic 130 may be transferred from the network access point 126 to the proxy access device 124, and then sent via the I/O interface 710 to the proxy host device 122. The intermediary module 144 of the proxy host device 122 may capture VPN data 148 from the inbound application traffic 130.

At 1518, the inbound application traffic 130 is sent to the TD 106 using the first connection. For example, the inbound application traffic 130 may be forwarded by the intermediary module 144 via the traffic proxy module 626 to the first network 112(1) by way of the network interface 612. Alternatively, the inbound application traffic 130 may be forwarded by the intermediary module 144 via a routing engine 152, which may route the inbound application traffic 130 to the first network 112(1).

At 1520, proxy session data 134 is collected. For example, the data collection module 628 may capture packets as they are transferred by the proxy host device 122. In a particular example, the intermediary module 144 may capture VPN data 148, which may include data sent through the VPN connection and which may include VPN protocol data and other data associated with the VPN connection.

At 1522, the proxy session data 134 may be sent to another device. For example, the proxy host device 122 may send the proxy session data 134 to the management server 118. In some implementations, the intermediary module 144 may send the proxy session data 134 and VPN data 148 to a management server 118 for analysis. Other implementations are also possible.

In one implementation, the proxy host device 122 may not have access to the first network 112(1). In this implementation, the proxy host device 122 may utilize the second network 112(2) for connectivity.

Figure 16:
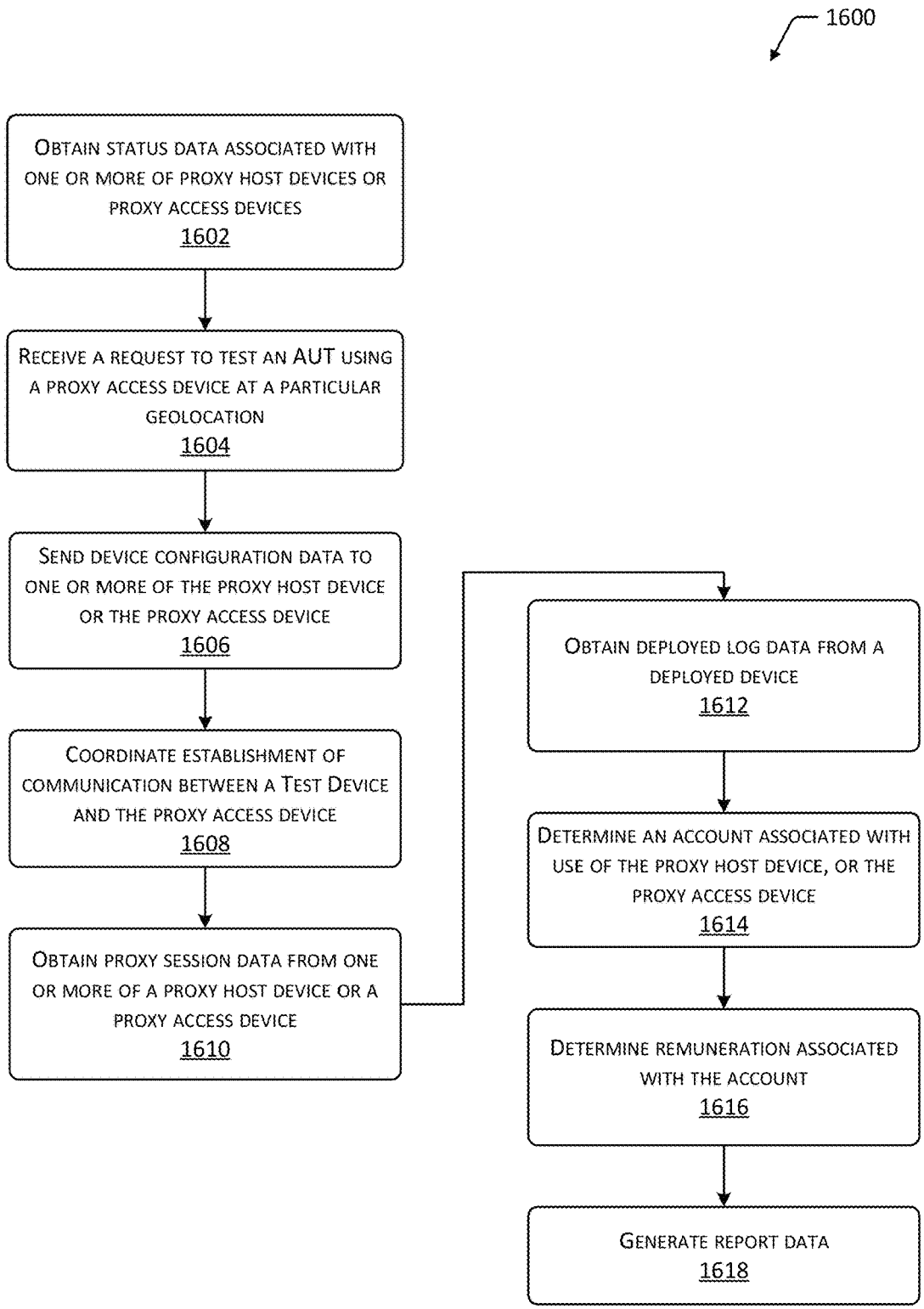
FIG. 16 is a flow diagram of a process for operating a management server, according to one implementation.

FIG. 16 is a flow diagram of a process 1600 for operating a management server 118, according to one implementation.

At 1602 status data 536 associated with one or more of the proxy host devices 122 or the proxy access devices 124 is obtained. For example, the status data 536 may be indicative of a particular proxy access device 124 at the second geolocation 110(2) and on the second network 112(2) that is ready to be used for testing.

At 1604, the management server 118 receives a request to test the AUT 104 using a proxy access device 124 at a particular geolocation 110. For example, the developer 102 may use the user interface to pick a particular geolocation 110.

At 1606, device configuration data 544 is sent to one or more of the proxy host device 122 or the proxy access device 124. The device configuration data 544 may be customized to the attributes of the proxy host device 122, the proxy access device 124, or both. For example, the device configuration data 544 may comprise instructions that are executable for a particular operating system that the proxy host device 122 is using. In one particular example, the device configuration data 544 may include a set of network rules including a list of host-port pairs to be ignored with respect to capturing VPN data 148.

At 1608, the management server 118 coordinates establishment of communication between the TD 106 and the proxy access device 124. For example, the management server 118 may send test configuration data 436 to the TD 106 that includes a network address and connection credentials for the proxy host device 122 to which the proxy access device 124 is tethered. The TD 106 may use the test configuration data 436 to establish a VPN connection via the intermediary module 144 of the proxy host device 122.

At 1610, proxy session data 134 is obtained. For example, the proxy host device 122 may collect and send the proxy session data 134 to the management server 118. Further, the intermediary module 144 may capture VPN data 148 including transmitted data, VPN protocol data, and other data and may send the VPN data 148 to the management server 118. In another example, the proxy session data 134 may be collected by the proxy access device 124, and the VPN data 148 may be collected by an intermediary module 144 of the proxy access device 124. Once collected, the proxy session data 134 and the VPN data 148 may be sent to the proxy host device 122 and then on to the management server 118.

In some implementations, the management server 118 may also be used to obtain information from the AUT 104 that is executed by one or more deployed devices 136. At 1612, the deployed log data 138 may be obtained from one or more of the deployed devices 136. As described above, the deployed devices 136 may send the deployed log data 138 to the management server 118.

In some situations, an owner or operator of the proxy host device 122 or the proxy access device 124 may receive remuneration for the use of their hardware, network access service, and so forth. For example, a rental entity may set up and maintain a proxy host device 122 and connect to it several proxy access devices 124.

At 1614, a rental account associated with the use of one or more of the proxy host device 122 or the proxy access device 124 may be determined. For example, an account associated with the rental entity may be looked up after receiving status data 536.

At 1616, an amount of remuneration associated with the rental account may be determined and subsequently provided. For example, usage information such as quantity of data transferred, amount of time used, premium associated with particular types of proxy access devices 124, and so forth, may be used to calculate the cost associated with the use of the proxy access device 124.

Once determined, the remuneration may be provided to the rental entity. For example, an account associated with the developer 102 that is using the equipment provided by the rental entity may be debited, and an account associated with the rental entity may be credited in the amount of the remuneration.

At 1618, the management server 118 may generate report data 142. As described above, the analysis module 140 may generate the report data 142 based at least in part on the log data 132 and the VPN data 148. In some implementations, the report data 142 may also include information indicative of the cost associated with the use of the system 100. For example, the report data 142 may indicate the cost of the remuneration provided to the rental entity.

Figure 17:
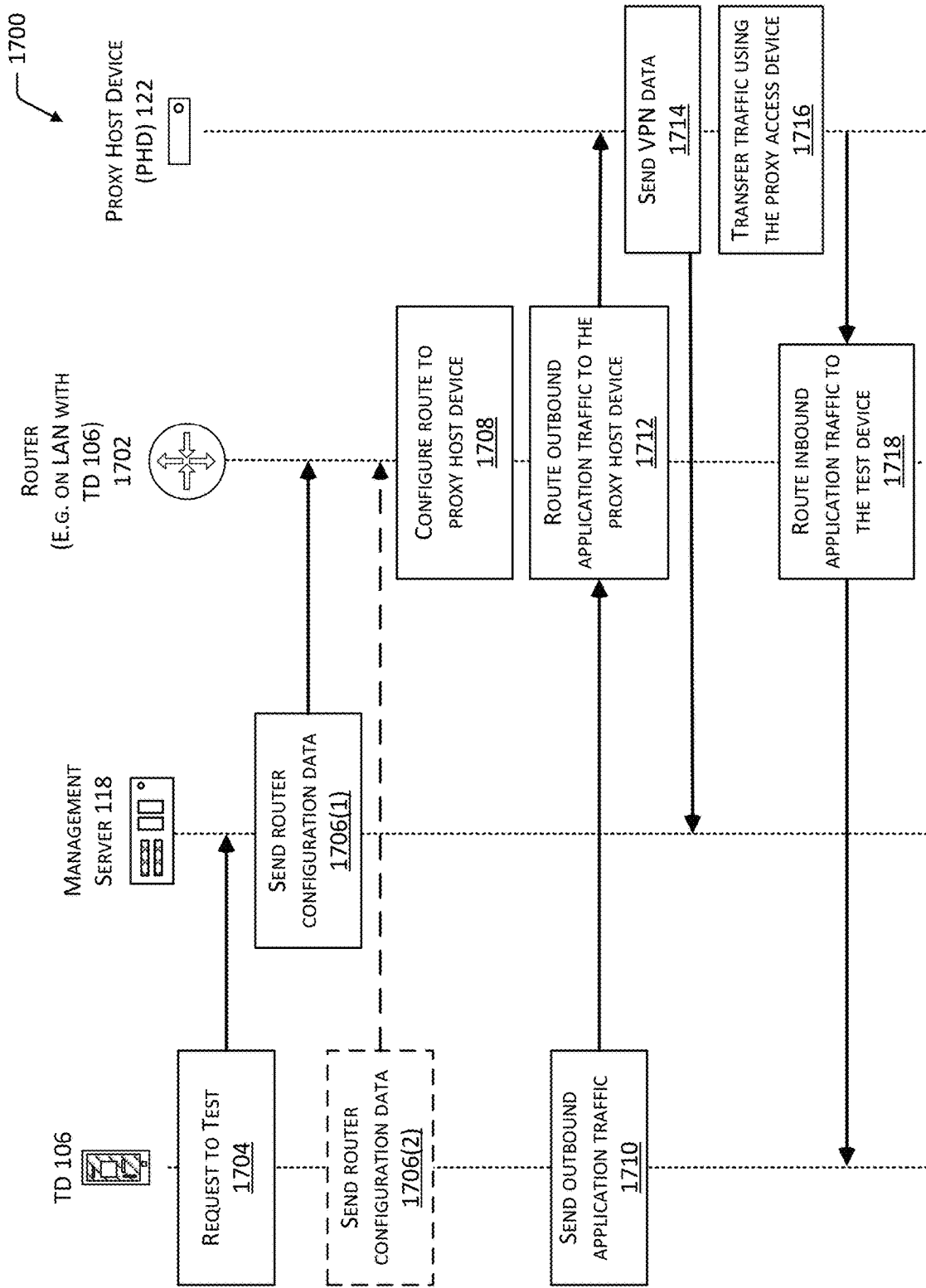
FIG. 17 is a flow diagram of a process for directing traffic to the proxy host device, according to one implementation.

FIG. 17 is a flow diagram 1700 of a process for directing traffic to the proxy host device 122, according to one implementation. Instead of the AUT 104 redirecting the AUT traffic 114, in the implementation depicted here a router on the first network 112(1) is configured and used as a transparent proxy. The AUT 104 may be unaware of the redirection by the router. In the illustrated example, the router 1702 may be part of a local area network associated with the TD 106. In an alternative embodiment, the router 1702 may be implemented as the routing engine 152 and DNS server 154 of a proxy host device 122 coupled to the TD 106. Other implementations are also possible.

A router 1702 is located in a network path on the network 112 between the TD 106 or workstation 108 executing the AUT 104 and the proxy host device 122. For example, the router 1702 may comprise a gateway on a local area network to which the TD 106 is connected.

At 1704 the TD 106 sends a request to test to the management server 118. For example, the developer 102 may have used the user interface to select São Paulo, Brazil for testing, and the SDK 212 may generate and send the request.

At 1706 router configuration data is sent to the router 1702. For example, the management server 118 may send the router configuration data to the router 1702. The router configuration data may comprise instructions to add an entry to a router table that directs traffic from a particular network address, media access control (MAC) address, and so forth to a particular destination network address. In some implementations, the router configuration data may include or be associated with credentials, digital certificates, and so forth to provide for authentication, encryption, and so forth to protect the router 1702 from unauthorized access.

In one implementation shown at 1706(1), the management server 118 sends the router configuration data to the router 1702. In another implementation shown at 1706(2), the TD 106 (or another device) sends the router configuration data to the router 1702. In other implementations, other devices may send the router configuration data or a portion thereof to the router 1702.

At 1708, a route to the proxy host device 122 is configured on the router 1702. For example, the router configuration data may be processed by the router 1702 and the routing table of the router 1702 may be updated to direct traffic from a particular MAC address or source IP address to the address of the proxy host device 122 at the second geolocation 110(2). In one possible example, the router 1702 may determine a VPN connection between the TD 106 and an intermediary module 144 of the proxy host device 122.

At 1710 outbound application traffic 128 is sent from the AUT 104 to the router 1702. For example, the outbound application traffic 128 may be sent via the VPN connection.

At 1712, the router 1702 routes the outbound application traffic 128 to the proxy host device 122 in accordance with the router configuration data. For example, the outbound application traffic 128 may be re-addressed to a new destination network address that is associated with the proxy host device 122. The intermediary module 144 of the proxy host device 122 may capture the VPN data 148, including VPN protocol data, transmitted data, session data, other data, or any combination thereof.

At 1714, the intermediary module 144 of the proxy host device 122 may send the VPN data 148 to the management server 118. For example, the intermediary module 144 may extract the VPN data 148 from the outbound application traffic 128 and may send the VPN data 148 to the management server 118.

At 1716 the proxy host device 122 transfers the AUT traffic 114 between the first network 112(1) and the second network 112(2) using the proxy access device 124. For example, the outbound application traffic 128 may be sent to the destination device 116 using the second network 112(2) and inbound application traffic 130 may be received from the destination device 116 using the first network 112(1).

At 1718, the router 1702 routes the inbound application traffic 130 as received from the proxy host device 122 to the TD 106.

While the redirection is described as a router, the redirection may be implemented on other devices that process traffic on the network 112. For example, a load balancer, firewall, or other network device may be configured to redirect the traffic.

Remote Control

The systems and techniques described may be used to provide for the access to the remote network at a second geolocation 110(2) using the functionality described above. In other implementations, the system may be used to remote control a proxy access device 124. For example, the developer 102 may use a workstation 108 with the user interface. The user interface may allow the developer 102 to select a particular geolocation 110, type of network 112, type of proxy access device 124, and so forth. The developer 102 may then use the selected proxy access device 124 or group of proxy access devices 124 to perform testing. In this implementation, the application under test 104 may be executing on the proxy access device 124. For example, the developer 102 may be testing a particular website and may use the browser installed on the proxy access device 124 to test that particular website using the second network 112(2).

Remote Control with Network Capture

As described above, in some implementations the system 100 may be used to remotely control a proxy access device 124. During remote control operation, the proxy access device 124 may receive instructions or data from the developer 102 or another user, the workstation 108, a test server, or another device. For example, the developer 102 may be able to remotely control the proxy access device 124 as if they had it in their possession.

Figure 18:
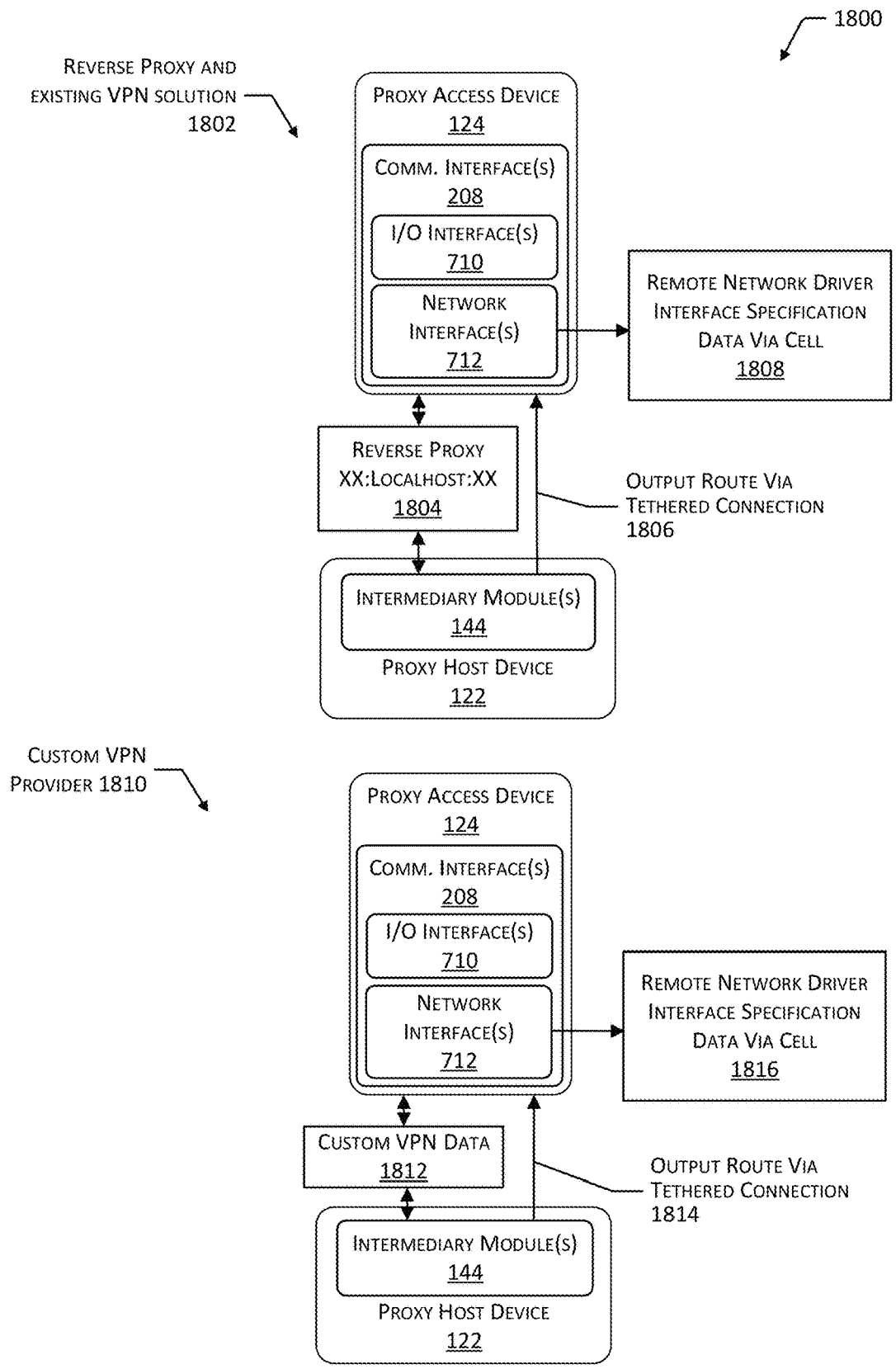
FIG. 18 is a flow diagram of a process for facilitating network capture using a proxy host device, according to one implementation.

FIG. 18 is a flow diagram 1800 that depicts processes for facilitating network capture using a proxy host device 122, according to one implementation. A first section 1802 depicts operation of the process on a device executing the Android operating system. A second section 1810 depicts operation of the process on a device executing the iOS operating system.

For example, in the first section 1802, the process utilizes a virtual private network (VPN) connection and the reverse proxy to pass traffic from the application under test 104 from the proxy access device 124 to the intermediary module 144 of the proxy host device 122. The proxy host device 122 may operate the intermediary module 144 to facilitate the VPN connection with the proxy access device 124. The intermediary module 144 may provide one or more functions. For example, the intermediary module 144 may capture and store VPN data 148 being sent to or from the application under test 104 that is executing on the proxy access device 124. Reverse proxy 1804 provides the connectivity between the intermediary module 144 executing on the proxy host device 122 and the proxy access device 124. Once the intermediary module 144 has extracted the VPN data 148, traffic is routed back to the proxy access device 124. In an example, the traffic is routed to the proxy access device 124 via an output route via a tethered connection 1808. In one possible example, the output route via the tethered connection 1806 uses a Remote Network Driver Interface Specification (RNDIS) tethering, and the RNDIS data is sent via a cell connection 1808, for example, using the Wideband Code Division Multiple Access (WCDMA) network (WCDN).

By utilizing a VPN, the traffic from the proxy access device 124 may be routed to the intermediary module 144 of the proxy host device 122. The VPN may operate over a USB connection or another wired or wireless connection. In this implementation, transferring traffic from the proxy access device 124 to the proxy host device 122 and using the intermediary module 144 provides several benefits. For example, one benefit is that the data capture, analysis, and other techniques may be readily changed without affecting the proxy access device 124, may be more complex or require more computing power than would otherwise be available at the proxy access device 124, and so forth.

In another example, in the second section 1810, the process is described for a device that uses a custom VPN provider, such as an Android VpnService, IOS NetworkExtension TunnelProvider, and so forth. In the section 1810, the proxy access device 124 may send custom VPN data 1812 to the intermediary module 144 of the proxy host device 122. The output data may be sent via an output rout via a tethered connection 1814 to the proxy access device 124. The proxy access device may then send the RNDIS data via a cell connection 1816.

Figure 19:
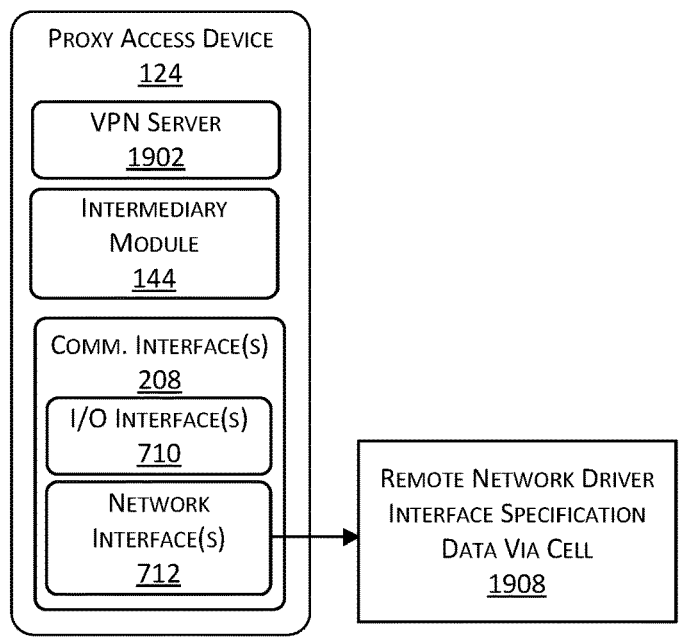
FIG. 19 depicts a proxy access device including a virtual private network module and an intermediary module, according to one implementation.

FIG. 19 is a flow diagram 1900 of a process for facilitating network capture using the proxy access device 124, according to one implementation. In this illustrated example, a VPN server 1902 and an intermediary module 144 may execute on the proxy access device 124. For example, the proxy access device 124 may initiate a VPN request including the intermediary module 144 to establish a VPN connection with a second device through a network 112.

In some implementations the proxy access device 124 may omit the SDK 212. For example, using the routing techniques described herein, the AUT traffic 114 between an AUT 104 and the destination device 116 may be routed to the proxy host device 122 for network capture or other processing, and returned to the proxy access device 124 for further operation, such as transmission on the WCDN.

In the illustrated example, the RNDIS data may be sent via the cell connection 1908. For example, AUT traffic 114 may be sent via the VPN connection, and the intermediary module 144 may capture the VPN data 148. The intermediary module 144 may then forward the data to the second device through the VPN connection. Other implementations are also possible.

In some situations, the network tunnel may be asymmetrical, such that communications to or from the proxy access device 124 or the proxy host device 122 may utilize different routes. For example, traffic from the proxy access device 124 that is being remote-controlled may utilize the egress through the first network 112(1) while other traffic egress is through the second network 112(2). In other implementations, other configurations may be used.

Use of the network tunnel may be controlled to manage one or more connection parameters. These connection parameters may include financial cost, bandwidth, latency, jitter, and so forth. The connection parameters may be static, or dynamically adjustable. In one implementation, the network tunnel may be controlled such that a first quantity of data is transferred via a relatively low-cost interface, while a second quantity of data is transferred via a relatively higher cost interface. For example, the network tunnel may be prioritized to use a wired broadband connection, and if that becomes unavailable switching to a wireless connection. In another example, the network tunnel may utilize a first wired broadband connection up until a maximum amount of data transfer (such as imposed by a carrier cap) has been reached, and then utilize a second connection.

In one implementation, some interfaces may be designated as being suitable for broadband connections and may include a minimum data rate limit. As long as traffic is being routed, when the data transfer is below the rate limit, the broadband connections may be used, and other non-broadband connections may not be used. In the event the amount of traffic exceeds the capacity of the broadband connection, other interfaces may be used. Continuing the example, if there is a burst of traffic that exceeds the broadband connection, the non-broadband connection (such as a WCDN) may be used. As the burst of traffic subsides, use of the non-broadband connection may decrease.

In some situations, it may be advantageous to provide a network tunnel to pass traffic use during testing. This tunnel may comprise a plurality of other connections that have been bonded together. For example, a plurality of LTE radios with routers that are designed to provide communication functionality may be in communication with the proxy host device 122. The proxy host device 122 may bond together the network path provided by the different LTE radios to provide what appears to be a single connection having an aggregate bandwidth greater than the individual connections.

Enclosure

Figure 20:
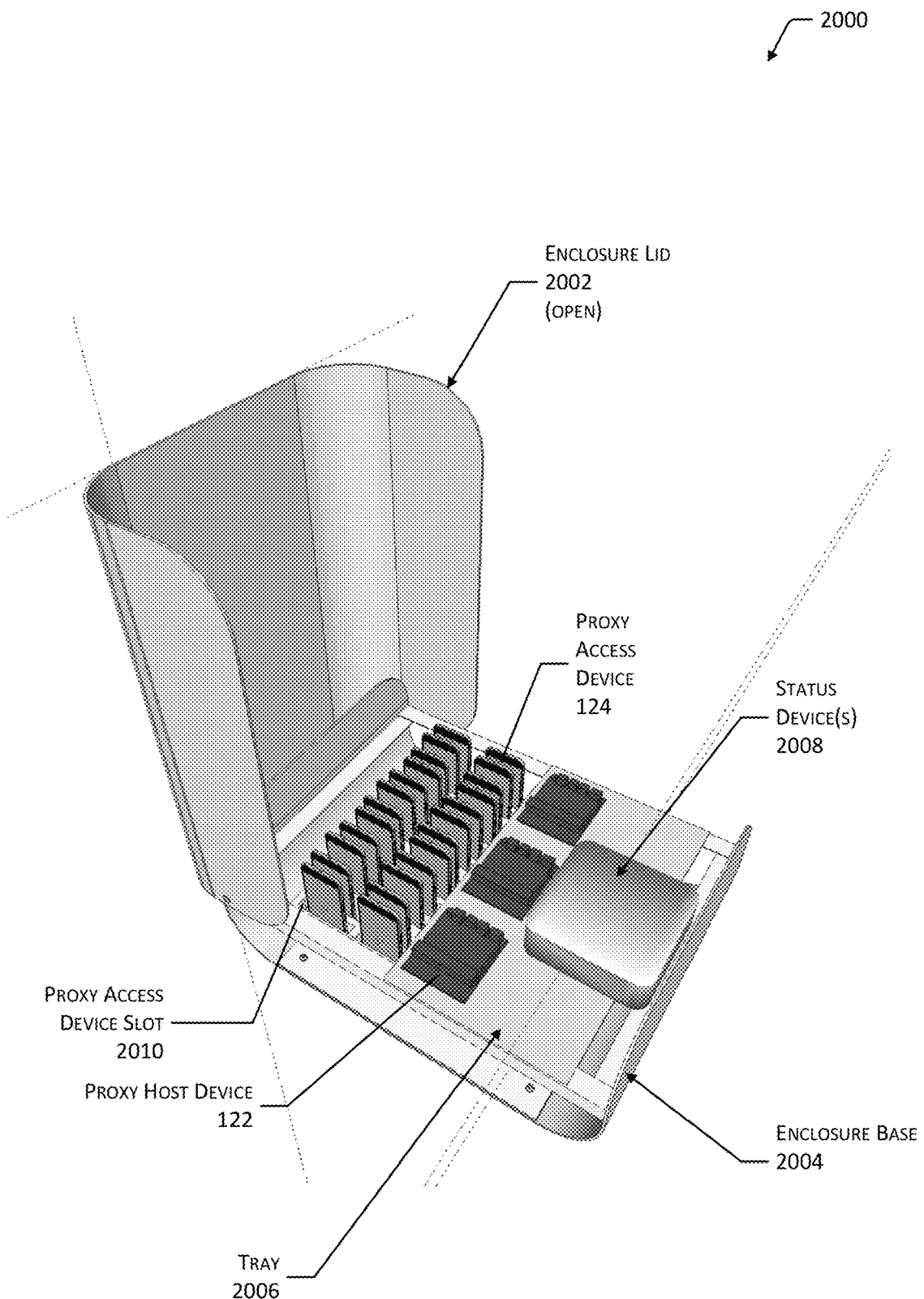
FIG. 20 is a rendering of an enclosure in an open configuration and including a tray holding proxy host devices and proxy access devices, according to one implementation.

FIG. 20 is a rendering of an enclosure 2000 including an enclosure lid 2002 in an open state relative to an enclosure base 2004. The enclosure base 2004 may include a tray 2006 that supports devices associated with the system 100. For example, as shown here, the tray 2006 supports proxy host devices 122 and proxy access devices 124. The tray 2006 may comprise one or more of plastic, ceramic, metal, cardboard, and so forth. For example, the tray 2006 may comprise ABS plastic. The tray 2006 may be configured to rest on a surface such as a shelf or table, mount to rails for placement within a standardized rack, or to be placed inside an enclosure 2000. In other implementations, other devices may be supported. For example, the proxy host device 122 may be located underneath the tray 2006 or elsewhere, while USB hubs are held by the tray 2006.

A portion of one or more status devices 2008 is depicted. The status device 2008 may comprise a controller, system-on-a-chip, or other computing device with a display device to provide output to an operator. For example, the status device 2008 may be configured to report status of the proxy host device 122, report the status of individual proxy access devices 124, and so forth. In some implementations the status device 2008 may itself initiate diagnostic or other housekeeping activities. In one implementation, each proxy host device 122 is associated with its own status device 2008 of the one or more status devices 2008. In other implementations, such as illustrated here, a single status device 2008 may be used for all the devices in the tray 2008.

The tray 2006 may include a plurality of proxy access device slots 2010. The proxy access device 124 may sit within the proxy access device slot 2010. Within the proxy access device slot 2010 may be a hole through which the cable connecting the proxy access device 124 and the proxy host device 122 may be routed. The enclosure base 2004 may include a plurality of proxy access device slots 2010 to receive a respective plurality of proxy access devices 124.

The enclosure 2000 may include one or more ports (not shown), such as RJ-45 connector ports sized to receive an Ethernet cable connector. Further, the enclosure 2000 may include a power supply (not shown) to supply power to the enclosure, the proxy host device 122, the status device 2008, proxy access devices 124, and so on.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving, at a proxy host device, a virtual private network (VPN) request for a VPN connection between a first device and a second device;
determining a host name and port number associated with the VPN request;
establishing a first VPN connection including a second VPN connection between the first device and an intermediary module and including a third VPN connection between the intermediary module and the second device;
capturing first VPN data sent by the first device through the second VPN connection using the intermediary module;
generating second VPN data based on the first VPN data;
sending the second VPN data to the second device through the third VPN connection;
determining an error in one or more of the first VPN data or the first VPN connection;
storing error data in a data store, the error data indicative of detection of the intermediary module by one or more of the first device or the second device;
storing the host name and the port number as a host-port pair in a list of one or more host-port pairs; and
transferring the first VPN data between the first device and the second device without capturing the first VPN data associated with the host-port pair.

2. The method of claim 1, further comprising:
receiving a second VPN request from the first device including the host name and the port number;
determining the host name and port number are in a set of host-port pairs; and
establishing a fourth VPN connection between the first device and the second device without the intermediary module.

3. The method of claim 1, further comprising:
receiving a second VPN request from the first device, the second VPN request including a second host name and a second port number;
establishing a fourth VPN connection including a fifth VPN connection between the first device and the intermediary module and a sixth VPN connection between the intermediary module and the second device;
determining a second error in one or more of the second VPN data or the fourth VPN connection;
storing the second host name and the second port number in the list of the one or more host-port pairs;
receiving a third VPN request from the first device, the third VPN request including a third host name and a third port number; and
repeating iterations of receiving subsequent VPN requests, establishing subsequent VPN connections, and storing host names and port numbers in the list of the one or more host-port pairs until a data transfer operation through a VPN connection is complete without determining error data indicative of detection of the intermediary module.

4. The method of claim 1, further comprising:
determining that one of the first device or the second device terminated the first VPN connection prior to completion of a data transfer operation;
determining the host-port pair associated with the first VPN connection; and
storing the host-port pair in the list of the one or more host-port pairs to be excluded from interception of the VPN data.

5. The method of claim 1, further comprising:
determining the error is a communication protocol error associated with the first VPN connection; and
determining the communication protocol error is indicative of detection of the intermediary module.

6. The method of claim 1, further comprising:
determining the error includes a request for renegotiation of the first VPN connection; and
determining the request for renegotiation is indicative of detection of the intermediary module.

7. A method comprising:
establishing a VPN connection between a first device and a second device using an intermediary module of a proxy host device, the VPN connection including a first VPN connection between the first device and the intermediary module and including a second VPN connection between the intermediary module and the second device;
capturing, using the intermediary module, first data sent by the first device to the second device using the VPN connection, wherein the first data includes one or more of application data, session data, or protocol data;
storing at least a portion of the first data;
sending the first data to the second device via the VPN connection;
determining an error associated with one or more of the VPN connection or transfer of the first data using the VPN connection;
stopping the capturing of the first data;
storing session data associated with the VPN connection; and
storing data that is associated with detection of the intermediary module by one or more of the first device or the second device.

8. The method of claim 7, wherein before establishing the VPN connection, the method further comprising:
storing first identifier data associated with a VPN module of the first device in VPN registration data in a memory of the proxy host device; and
storing second identifier data associated with a routing engine of the proxy host device in the VPN registration data.

9. The method of claim 8, further comprising:
one or more of:
storing third identifier data associated with a remote procedure call (RPC) application of the first device in the VPN registration data; or
installing a root certificate on the first device; and
wherein the third identifier data or the root certificate enable synchronous capture of VPN data and network data.

10. The method of claim 7, further comprising:
receiving a request for renegotiation of the VPN connection from one of the first device or the second device; and
wherein the error is determined based on the request for renegotiation.

11. The method of claim 7, further comprising determining the error includes a communication protocol error indicative of detection of the intermediary module.

12. The method of claim 7, further comprising:
establishing the first VPN connection between the first device and the intermediary module representing the second device;
establishing the second VPN connection between the intermediary module and the second device representing as the first device; and
the VPN connection comprising the first VPN connection and the second VPN connection.

13. The method of claim 7, further comprising providing, from the intermediary module, the first data to the first device to send the first data to the second device via an interface of the first device.

14. The method of claim 7, further comprising:
storing a host name and a port number as a set of network rules defining exclusions for one or more host-port pairs;
receiving, at the proxy host device, a VPN request to establish a third VPN connection between the first device and the second device;
determining the host name and the port number associated with the VPN request;
determining the host name and the port number are included in the set of network rules defining a list of host-port pairs; and
establishing the third VPN connection without using the intermediary module.

15. The method of claim 7, wherein determining the error comprises detecting termination of the VPN connection by one or more of the first device or the second device; and further comprising:
determining a host-port pair associated with the VPN connection; and
storing the host-port pair in a list of one or more host-port pairs of a set of network rules.

16. A first computing device comprising:
one or more communication interfaces;
a processor; and
a memory storing instructions that cause the processor to:
establish a first virtual private network (VPN) connection between a first device and a second device, the first VPN connection including a second VPN connection between the first device and an intermediary module and including a third VPN connection between the intermediary module and the second device;
determine first data from the first device via the first VPN connection, the first data including one or more of application data, VPN protocol data, or session data;
store the first data;
send the first data to the second device via the third VPN connection;
determine an error in one or more of the first data or data associated with one or more of the first VPN connection or the second VPN connection; and
terminate determination of the first data.

17. The first computing device of claim 16, further comprising instructions that cause the processor to:
determine the error is associated with detection of the intermediary module; and
store data in the memory that is indicative of detection of the intermediary module by one or more of the first device or the second device.

18. The first computing device of claim 16, wherein the error includes one or more of:
a protocol error indicative of detection of the intermediary module; or
a request for renegotiation of one or more of the first VPN connection or the second VPN connection suggestive of detection of the intermediary module.

19. The first computing device of claim 16, further comprising instructions that cause the processor to:

receive configuration data from a second computing device, the configuration data including one or more host-port pairs; and store the configuration data in the one or more host-port pairs of a set of network rules.

20. The first computing device of claim 16, further comprising instructions that cause the processor to:

receive a request for a fourth VPN connection from the first device, the request for the fourth VPN connection including a first host name and a first port number;

determine the first host name and the first port number are not in a list of host-port pairs of a set of network rules;

establish the fourth VPN connection between the first device and the second device, the fourth VPN connection including a fifth VPN connection between the first device and the intermediary module and including a sixth VPN connection between the intermediary module and the second device;

determine, using the intermediary module, second data from the first device via the fifth VPN connection, the second data including one or more of application data, VPN protocol data, or session data;

store the second data in the memory;

send the second data to the second device via the sixth VPN connection;

determine a second error from one of the second data or session data related to one or more of the fifth VPN connection or the sixth VPN connection;

store the first host name and the first port number in the list of host-port pairs of the set of network rules; and repeat until a data transfer operation through a VPN connection between the first device and the second device is completed without determining a third error.

* * * * *